United States Patent
Faulkner et al.

(10) Patent No.: US 9,542,103 B2
(45) Date of Patent: *Jan. 10, 2017

(54) METHOD AND SYSTEM FOR MONITORING AND ANALYZING QUALITY OF SERVICE IN A STORAGE SYSTEM

(71) Applicant: NETAPP, INC., Sunnyvale, CA (US)

(72) Inventors: Kevin Faulkner, Westford, MA (US); Leon Fairbanks, Winchester, MA (US); Siu Wu, Canton, MA (US); Vinod Vasant Pai, Woburn, MA (US); Ulhas Pai, Woburn, MA (US)

(73) Assignee: NETAPP, INC., Sunnyvale, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/535,587

(22) Filed: Nov. 7, 2014

(65) Prior Publication Data
US 2015/0199139 A1 Jul. 16, 2015

Related U.S. Application Data

(63) Continuation-in-part of application No. 14/154,941, filed on Jan. 14, 2014.

(51) Int. Cl.
*G06F 3/06* (2006.01)
*G06F 11/30* (2006.01)
*G06F 11/34* (2006.01)

(52) U.S. Cl.
CPC .......... *G06F 3/0613* (2013.01); *G06F 3/0653* (2013.01); *G06F 3/0689* (2013.01);
(Continued)

(58) Field of Classification Search
CPC .... G06F 3/0613; G06F 3/0653; G06F 3/0689; G06F 11/3034; G06F 11/3419; G06F 11/3452; G06F 11/3485
See application file for complete search history.

(56) References Cited

U.S. PATENT DOCUMENTS 5,996,090 A * 11/1999 Hellerstein ......... G06F 11/3447
714/25
7,769,021 B1 8/2010 Chen et al.
(Continued)

FOREIGN PATENT DOCUMENTS

WO WO2013/072232 5/2013

OTHER PUBLICATIONS

International Search Report on corresponding PCT application (PCT/US2015/010764) from International Searching Authority (EPO) dated Apr. 10, 2015.
(Continued)

*Primary Examiner* — David X Yi
*Assistant Examiner* — Tahilba Puche
(74) *Attorney, Agent, or Firm* — Klein, O'Neill & Singh, LLP

(57) ABSTRACT

Methods and systems for monitoring quality of service (QOS) data for a plurality of storage volumes are provided. QOS data is collected for the plurality of storage volumes and includes a response time in which each of the plurality of storage volumes respond to an input/output (I/O) request. The process determines an average of N collected QOS data points at any given time; and iteratively analyzes each QOS data point to detect if a step-up or a step-down function has occurred, where a step-up function represents an unpredictable increase in value of a data point and a step-down function is an unpredictable decrease in value of the data point. A subset of the N QOS data points based on when the step-up function or step-down function occurs is selected for
(Continued)

analysis and an expected range for future QOS data based on the subset of the N QOS data points is generated.

19 Claims, 22 Drawing Sheets

(52) U.S. Cl.
CPC ...... *G06F 11/3034* (2013.01); *G06F 11/3419* (2013.01); *G06F 11/3452* (2013.01); *G06F 11/3485* (2013.01)

(56) References Cited

U.S. PATENT DOCUMENTS

| | | | |
|---|---|---|---|
| 8,370,679 | B1 | 2/2013 | Gawali et al. |
| 8,417,812 | B1* | 4/2013 | Gulati ............... G06F 11/00 709/224 |
| 8,473,566 | B1 | 6/2013 | Cardente et al. |
| 8,621,178 | B1 | 12/2013 | Lazar |
| 9,317,393 | B2* | 4/2016 | Poola ............... G06F 11/3452 |
| 2007/0083482 | A1 | 4/2007 | Rathi et al. |
| 2010/0082513 | A1 | 4/2010 | Liu |
| 2012/0317358 | A1 | 12/2012 | Ando et al. |
| 2013/0117515 | A1 | 5/2013 | Ashmore et al. |
| 2013/0262678 | A1 | 10/2013 | Tung et al. |
| 2014/0047263 | A1 | 2/2014 | Coatney et al. |
| 2014/0122706 | A1 | 5/2014 | Boerner et al. |
| 2014/0325095 | A1 | 10/2014 | Kang et al. |
| 2014/0337562 | A1 | 11/2014 | Long et al. |

OTHER PUBLICATIONS

Written Opinion on corresponding PCT application (PCT/US2015/010764) from International Searching Authority (EPO) dated Apr. 10, 2015.
Non-Final Office Action on co-pending U.S. Appl. No. 14/535,565 dated Apr. 22, 2016.
Notice of Allowance on co-pending U.S. Appl. No. 14/154,992 dated Apr. 13, 2016.
Non-Final Office Action on co-pending U.S. Appl. No. 14/154,941 dated May 5, 2016.
Notice of Allowance on co-pending US application (U.S. Appl. No. 14/154,941) mailed Sep. 26, 2016.
Notice of Allowance on co-pending US application (U.S. Appl. No. 14/535,565) mailed Sep. 26, 2016.
Office Action on co-pending US application (U.S. Appl. No. 14/531,246) mailed Nov. 15, 2016.

* cited by examiner

Phase 0

Phase 2

| Service center | State of workload detail stats at 618 | | Workload Total 622 | Workload role in analysis result 624 | | | Recommendations 626 |
|---|---|---|---|---|---|---|---|
| 616 | Visit | Service time 620 | Response time | Bully | Victim | Other | |
| DELAY_CENTER_NETWORK | normal | n/a | normal | No | No | Yes | n/a |
| DELAY_CENTER_NETWORK | normal | n/a | High | No | Yes | No | - Verify there are no bottlenecks or issues in the network |
| DELAY_CENTER_NETWORK | normal | n/a | Low | No | No | Yes | n/a |
| DELAY_CENTER_NETWORK | High | n/a | normal | Yes | No | No | - Verify there are no bottlenecks or issues in the network |
| DELAY_CENTER_NETWORK | High | n/a | High | Yes | Yes | No | - Verify there are no bottlenecks or issues in the network |
| DELAY_CENTER_NETWORK | High | n/a | Low | Yes | No | No | - Verify there are no bottlenecks or issues in the network |
| DELAY_CENTER_NETWORK | Low | n/a | normal | No | No | Yes | n/a |
| DELAY_CENTER_NETWORK | Low | n/a | High | No | Yes | No | - Verify there are no bottlenecks or issues in the network |
| DELAY_CENTER_NETWORK | Low | n/a | Low | No | No | Yes | n/a |

FIG. 6B

| Service center 616 | State of workload detail stats at 620 | | Workload Total Response time | Workload role in analysis result 624 | | | Recommendations 626 |
|---|---|---|---|---|---|---|---|
| 618 | Visit | Service time | | Bully | Victim | Other | |
| CPU_NBLADE | normal | normal | normal | No | No | Yes | |
| CPU_NBLADE | normal | normal | High | No | Yes | No | - Consider moving logical interfaces to a node with lower CPU utilization |
| CPU_NBLADE | normal | normal | Low | No | No | Yes | n/a |
| CPU_NBLADE | normal | High | normal | Yes | No | No | - Consider moving logical interfaces to a node with lower CPU utilization<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CPU_NBLADE | normal | High | High | Yes | Yes | No | - Consider moving logical interfaces to a node with lower CPU utilization<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CPU_NBLADE | normal | High | Low | Yes | No | No | n/a |
| CPU_NBLADE | normal | Low | normal | No | No | Yes | n/a |
| CPU_NBLADE | normal | Low | High | No | Yes | No | - Consider moving logical interfaces to a node with lower CPU utilization |
| CPU_NBLADE | normal | Low | Low | No | No | Yes | n/a |

FIG. 6C

| Service center 616 | State of workload detail stats at 620 | | Workload Total 622 | Workload role in analysis result 624 | | | Recommendations 626 |
|---|---|---|---|---|---|---|---|
| | Visit 618 | Service time | Response time | Bully | Victim | Other | |
| POLICY_GROUP | normal | n/a | normal | No | No | Yes | - Consider changing the QoS limit of the policy group to accommodate excessive activity<br>- Consider moving a workload to a different or new policy group |
| POLICY_GROUP | normal | n/a | High | No | Yes | No | |
| POLICY_GROUP | normal | n/a | Low | No | No | Yes | n/a |
| POLICY_GROUP | High | n/a | normal | No | Yes | No | - Consider changing the QoS limit of the policy group to accommodate excessive activity<br>- Consider moving a workload to a different or new policy group |
| POLICY_GROUP | High | n/a | High | No | Yes | No | - Consider changing the QoS limit of the policy group to accommodate excessive activity<br>- Consider moving a workload to a different or new policy group |
| POLICY_GROUP | High | n/a | Low | No | Yes | No | |
| POLICY_GROUP | Low | n/a | normal | No | No | Yes | n/a |
| POLICY_GROUP | Low | n/a | High | No | Yes | No | - Consider changing the QoS limit of the policy group to accommodate excessive activity<br>- Consider moving a workload to a different or new policy group |

FIG. 6D

| Service center 616 | State of workload detail stats at 618 | | Workload Total Response time | Workload role in analysis result 624 | | | Recommendations 626 |
|---|---|---|---|---|---|---|---|
| | Visit | Service time 620 | | Bully 622 | Victim | Other | |
| CLUSTER_INTERCONNECT | normal | n/a | normal | No | No | Yes | n/a |
| CLUSTER_INTERCONNECT | normal | n/a | High | No | Yes | No | - Consider rearranging logical interface to reduce indirect access |
| CLUSTER_INTERCONNECT | normal | n/a | Low | No | No | Yes | n/a |
| CLUSTER_INTERCONNECT | High | n/a | normal | Yes | No | No | - Consider rearranging logical interfaces to reduce indirect access<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CLUSTER_INTERCONNECT | High | n/a | High | Yes | Yes | No | - Consider rearranging logical interface to reduce indirect access<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CLUSTER_INTERCONNECT | High | n/a | Low | Yes | No | No | - Consider rearranging logical interface to reduce indirect access<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CLUSTER_INTERCONNECT | Low | n/a | normal | No | No | Yes | n/a |
| CLUSTER_INTERCONNECT | Low | n/a | High | No | Yes | No | - Consider rearranging logical interface to reduce indirect access |
| CLUSTER_INTERCONNECT | Low | n/a | Low | No | No | Yes | n/a |

FIG. 6E

| 616 Service center | State of workload detail stats at 620 | | Workload Total 622 Response time | Workload role in analysis result 624 | | | 626 Recommendations |
| --- | --- | --- | --- | --- | --- | --- | --- |
| | Visit | Service time | | Bully | Victim | Other | |
| CPU_DBLADE | normal | normal | normal | No | No | Yes | n/a |
| CPU_DBLADE | normal | normal | High | No | Yes | No | - Consider moving the workload to another node with a lower CPU utilization. |
| CPU_DBLADE | normal | normal | Low | No | No | Yes | n/a |
| CPU_DBLADE | normal | High | normal | Yes | No | No | - Move a large workload to a less utilized aggregate<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CPU_DBLADE | normal | High | High | Yes | Yes | No | - Consider moving the workload to another node with a lower CPU utilization.<br>- Move a large workload to a less utilized aggregate<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| CPU_DBLADE | normal | High | Low | Yes | No | No | n/a |
| CPU_DBLADE | normal | Low | normal | No | No | Yes | n/a |
| CPU_DBLADE | normal | Low | High | No | Yes | No | - Consider moving the workload to another node with a lower CPU utilization. |
| CPU_DBLADE | normal | Low | Low | No | No | Yes | n/a |

FIG. 6F

| Service center 616 | State of workload detail stats at 618 Visit | 620 Service time | Workload Total 622 Response time | Workload role in analysis result 624 Bully | Victim | Other | Recommendations 626 |
|---|---|---|---|---|---|---|---|
| AGGREGATE | normal | n/a | normal | No | No | Yes | n/a |
| AGGREGATE | normal | n/a | High | No | Yes | No | - Move a large workload to a less utilized aggregate<br>- Consider adding disks to the aggregate<br>- Enable flash cache or Flash Pool<br>- Consider setting a QoS limit on the policy group that has workloads with heavy write activity |
| AGGREGATE | normal | n/a | Low | No | No | Yes | n/a |
| AGGREGATE | High | n/a | normal | Yes | No | No | - Move a large workload to a less utilized aggregate<br>- Consider adding disks to the aggregate<br>- Enable flash cache or Flash Pool<br>- Consider setting a QoS limit on the policy group that has workloads with heavy write activity |
| AGGREGATE | High | n/a | High | Yes | Yes | No | - Move a large workload to a less utilized aggregate<br>- Consider adding disks to the aggregate<br>- Enable flash cache or Flash Pool<br>- Consider setting a QoS limit on the policy group that has workloads with heavy write activity |
| AGGREGATE | High | n/a | Low | Yes | No | No | - Move a large workload to a less utilized aggregate<br>- Consider adding disks to the aggregate<br>- Enable flash cache or Flash Pool<br>- Consider setting a QoS limit on the policy group that has workloads with heavy write activity |
| AGGREGATE | Low | n/a | normal | No | No | Yes | n/a |

FIG. 6G

| 616 Service center | 618 Visit | 620 Service time | 622 Total Response time | Bully | Victim | Other | 626 Recommendations |
|---|---|---|---|---|---|---|---|
| | | State of workload detail stats at | Workload | Workload role in analysis result 624 | | | |
| DISK_HDD | normal | normal | normal | No | No | Yes | n/a |
| DISK_HDD | normal | normal | High | No | Yes | No | - Consider adding disks to the aggregate<br>- Enable flash cache<br>- Enable Flash Pool<br>- Move a large workload to a less utilized aggregate<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload. |
| DISK_HDD | normal | normal | Low | No | No | Yes | n/a |
| DISK_HDD | normal | High | normal | Yes | No | No | - Enable flash cache<br>- Enable Flash Pool<br>- Move a large workload to a less utilized aggregate<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity<br>- Consider changing the client workload.<br>- Consider adding disks to the aggregate<br>- Enable flash cache<br>- Enable Flash Pool<br>- Move a large workload to a less utilized aggregate<br>- Consider changing the QoS limit of the policy group to accommodate excessive activity<br>- Verify if other volumes in the policy group are doing unusual amount of activity<br>- Consider setting a QoS limit on the policy group that has workloads with heavy write activity |
| DISK_HDD | normal | High | High | No | Yes | No | - Consider setting a QoS limit on the policy group that has workloads with heavy write activity |

FIG. 6H

METHOD AND SYSTEM FOR MONITORING AND ANALYZING QUALITY OF SERVICE IN A STORAGE SYSTEM

CROSS-REFERENCE TO RELATED APPLICATION

This patent application is a continuation-in-part (CIP) of the U.S. patent application Ser. No. 14/154,941 filed on Jan. 14, 2014, the disclosure of which is incorporated herein by reference in its entirety.

TECHNICAL FIELD

The present disclosure relates to monitoring and analyzing quality of service (QOS) performance in a storage system.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is used in a storage environment to provide certain throughput in processing input/output (I/O) requests, a response time goal within, which I/O requests are processed and a number of I/O requests processed within a given time (for example, in a second (IOPS). Throughput means an amount of data transferred within a given time in response to the I/O requests, for example, in megabytes per second (Mb/s). Different QOS levels may be provided to different clients depending on client service levels.

To process an I/O request to read and/or write data, various resources are used within a storage system, for example, network resources, processors, storage devices and others. The different resources perform various functions in processing the I/O requests.

As storage systems continue to expand in size and operating speeds, it is desirable to efficiently monitor resource usage within the storage system and analyze QOS data so that any incidents based on not meeting QOS target goals can be identified and handled appropriately. Continuous efforts are being made to efficiently monitor and analyze QOS data.

SUMMARY

In one aspect, a machine implemented method is provided. The method includes collecting quality of service (QOS) data for a plurality of storage volumes from a storage operating system of a storage system; wherein the QOS data includes a response time in which each of the plurality of storage volumes respond to an input/output (I/O) request; determining an average of N collected QOS data points at any given time; iteratively analyzing each QOS data point to detect if a step-up or a step-down function has occurred, where a step-up function represents an unpredictable increase in value of a data point and a step-down function is an unpredictable decrease in value of the data point; selecting a subset of the N QOS data points based on when the step-up function or step-down function occurs; generating an expected range for future QOS data based on the subset of the N QOS data points; and monitoring QOS data for each storage volume for determining whether a current QOS data for each storage volume is within the expected range.

In another aspect, a non-transitory, machine readable storage medium having stored thereon instructions for performing a method, comprising machine executable code is provided. The machine executable code, when executed by at least one machine, causes the machine to: collect quality of service (QOS) data for a plurality of storage volumes from a storage operating system of a storage system; wherein the QOS data includes a response time in which each of the plurality of storage volumes respond to an input/output (I/O) request; determine an average of N collected QOS data points at any given time; iteratively analyze each QOS data point to detect if a step-up or a step-down function has occurred, where a step-up function represents an unpredictable increase in value of a data point and a step-down function is an unpredictable decrease in value of the data point; select a subset of the N QOS data points based on when the step-up function or step-down function occurs; generate an expected range for future QOS data based on the subset of the N QOS data points; and monitor QOS data for each storage volume for determining whether a current QOS data for each storage volume is within the expected range.

In yet another aspect, a system having a memory with machine readable medium comprising machine executable code having stored thereon instructions is provided. A processor module coupled to the memory is configured to execute the machine executable code to: collect quality of service (QOS) data for a plurality of storage volumes from a storage operating system of a storage system; wherein the QOS data includes a response time in which each of the plurality of storage volumes respond to an input/output (I/O) request; determine an average of N collected QOS data points at any given time; iteratively analyze each QOS data point to detect if a step-up or a step-down function has occurred, where a step-up function represents an unpredictable increase in value of a data point and a step-down function is an unpredictable decrease in value of the data point; select a subset of the N QOS data points based on when the step-up function or step-down function occurs; generate an expected range for future QOS data based on the subset of the N QOS data points; and monitor QOS data for each storage volume for determining whether a current QOS data for each storage volume is within the expected range.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures:

FIG. 6B shows an example of a remediation plan, according to one aspect of the present disclosure; FIG. 6C shows an example of another remediation plan, according to one aspect of the present disclosure; FIG. 6D shows an example of another remediation plan, according to one aspect of the present disclosure; FIG. 6E shows an example of another remediation plan, according to one aspect of the present disclosure; FIG. 6F shows an example of another remediation plan, according to one aspect of the present disclosure; FIG. 6G shows an example of another remediation plan, according to one aspect of the present disclosure; and FIG. 6H shows yet another example of a remediation plan, according to one aspect of the present disclosure;

DETAILED DESCRIPTION

Figure 1:
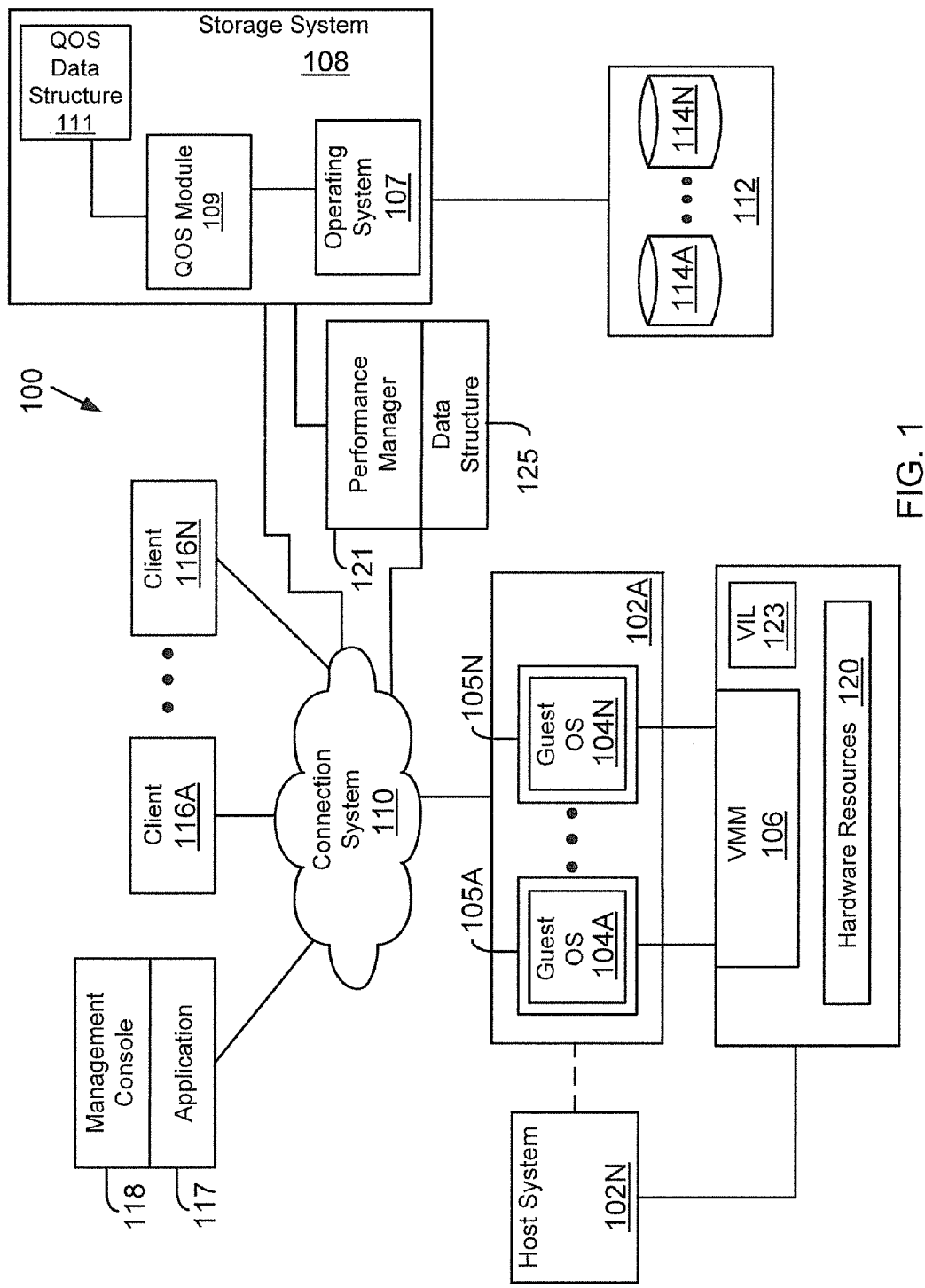
FIG. 1 shows an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, a performance manager module is provided that interfaces with a storage operating system to collect quality of service (QOS) data. QOS provides a certain throughput (i.e. data transfer within a given time interval), latency and/or a number of input/output operations that can be processed within a time interval, for example, in a second (referred to as IOPS). Latency means a delay in completing the processing of an I/O request and may be measured using different metrics for example, an response time in processing I/O requests.

The storage system uses various resources to process I/O requests for writing and reading data to and from storage devices. The storage system maintains various counters and data measurement objects (QOS data) for providing QOS to clients. The QOS data may include throughput data, a number of IOPS in a measurement period, and an average response time within the measurement period, a service time per visit to a resource, a wait time per visit to the resource and a number of visits at the resource used for processing I/O requests.

The performance manager uses historical QOS data obtained from the storage system to predict an expected range (or threshold value) for future QOS data. Future actual QOS data is compared with the expected range to detect abnormal behavior. The abnormal behavior may be declared as an incident.

The incident is analyzed by the performance manager to identify a victim storage volume (or logical unit number (LUN) (described below), a resource that may be in usage contention among different storage volumes and a bully that may be overusing the resource in contention. A remediation plan maybe proposed to a client based on the incident analysis performed by the performance manager.

System 100:

FIG. 1 shows an example of a system 100, where the adaptive aspects disclosed herein may be implemented. System 100 includes a performance manager 121 that interfaces with a storage operating system 107 of a storage system 108 for receiving QOS data. The performance manager 121 obtains the QOS data and stores it at a local data structure 125. In one aspect, performance manager 121 analyzes the QOS data for detecting incidents and identifying resources and storage volumes affected by an incident. Details regarding the various operations performed by the performance manager 121 are provided below.

In one aspect, storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines (VMs) 105A-105N). A storage volume is a logical storage object and typically includes a file system in a NAS environment or a logical unit number (LUN) in a SAN environment. The aspects described herein are not limited to any specific format in which physical storage is presented as logical storage (volume, LUNs and others)

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit. The QOS policy information may be stored at a QOS data structure 111 maintained by a QOS module 109. QOS at the storage system level may be implemented by the QOS module 109. QOS module 109 maintains various QOS data types that are monitored and analyzed by the performance manager 121, as described below in detail.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 executing via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102 includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102 with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1 may be customized to implement the aspects of the present disclosure. Furthermore, VMM 106 (or VIL 123)

may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels, where a client with a higher service level may be provided with more storage space than a client with a lower service level. A client at a higher level may also be provided with a certain QOS vis-à-vis a client at a lower level.

Figure 2A:
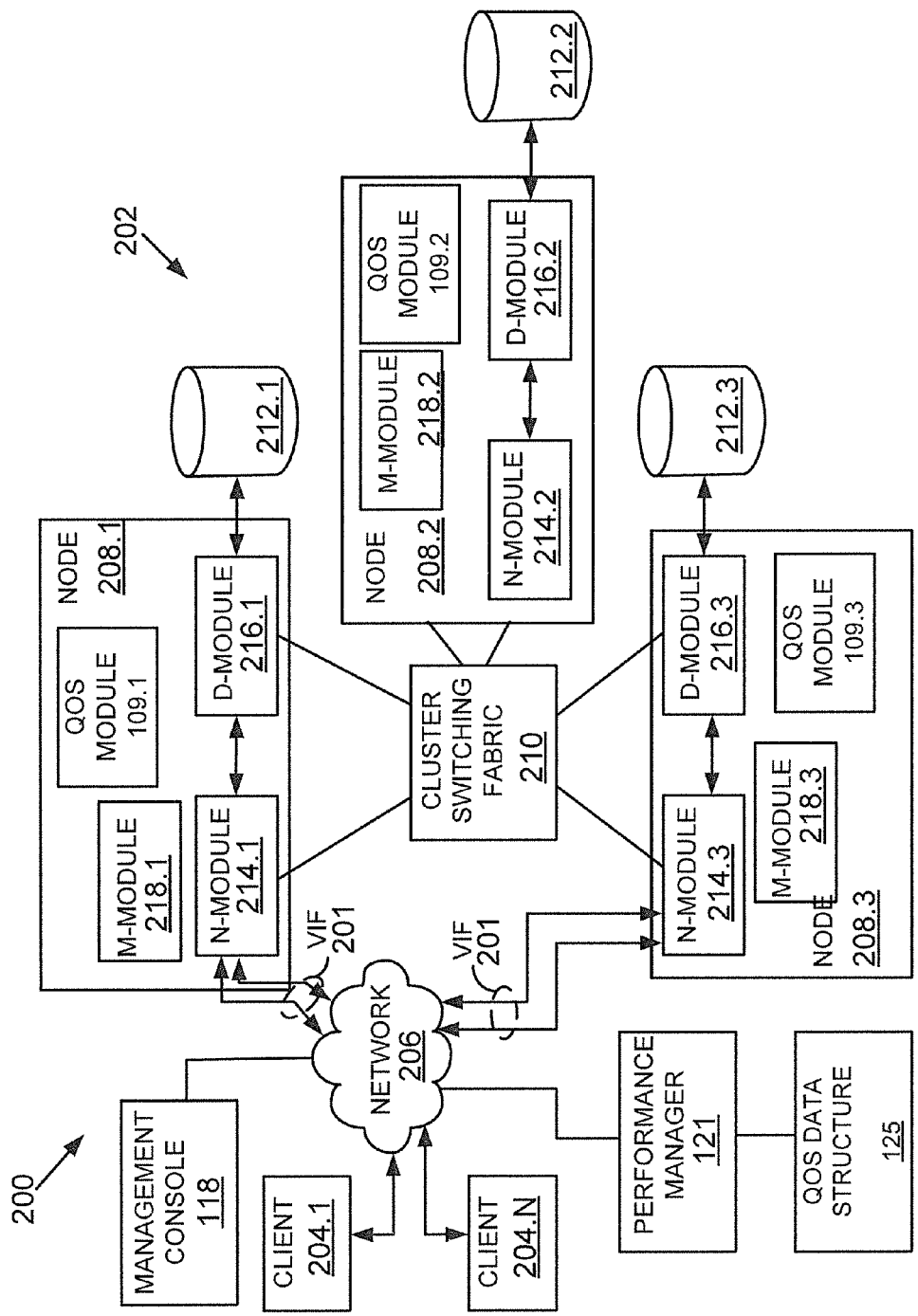
FIG. 2A shows an example of a clustered storage system, used according to one aspect of the present disclosure.

Although storage system 108 is shown as a stand-alone system, i.e. a non-cluster based system, in another aspect, storage system 108 may have a distributed architecture; for example, a cluster based system of FIG. 2A. Before describing the various aspects of the performance manager 121, the following provides a description of a cluster based storage system.

Clustered Storage System:

FIG. 2A shows a cluster based storage environment 200 having a plurality of nodes for managing storage devices, according to one aspect. Storage environment 200 may include a plurality of client systems 204.1-204.N (similar to clients 116A-116N, FIG. 1), a clustered storage system 202, performance manager 121, management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212.

Each node may execute or interface with a QOS module, shown as 109.1-109.3 that is similar to the QOS module 109. The QOS module 109 may be executed for each node or a single QOS module may be used for the entire cluster. The aspects disclosed herein are not limited to the number of instances of QOS module 109 that may be used in a cluster. Details regarding QOS module 109 are provided below.

A switched virtualization layer including a plurality of virtual interfaces (VIFs) 201 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines), in which each vserver represents a single storage system namespace with separate network access. Each vserver has a client domain and a security domain that are separate from the client and security domains of other vservers. Moreover, each vserver is associated with one or more VIFs and can span one or more physical nodes, each of which can hold one or more VIFs and storage associated with one or more vservers. Client systems can access the data on a vserver from any node of the clustered system, through the VIFs associated with that vserver. It is noteworthy that the aspects described herein are not limited to the use of vservers.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Performance manager 121 interfaces with the various nodes and obtains QOS data for QOS data structure 125. Details regarding the various modules of performance manager are now described with respect to FIG. 2B.

Figure 2B:
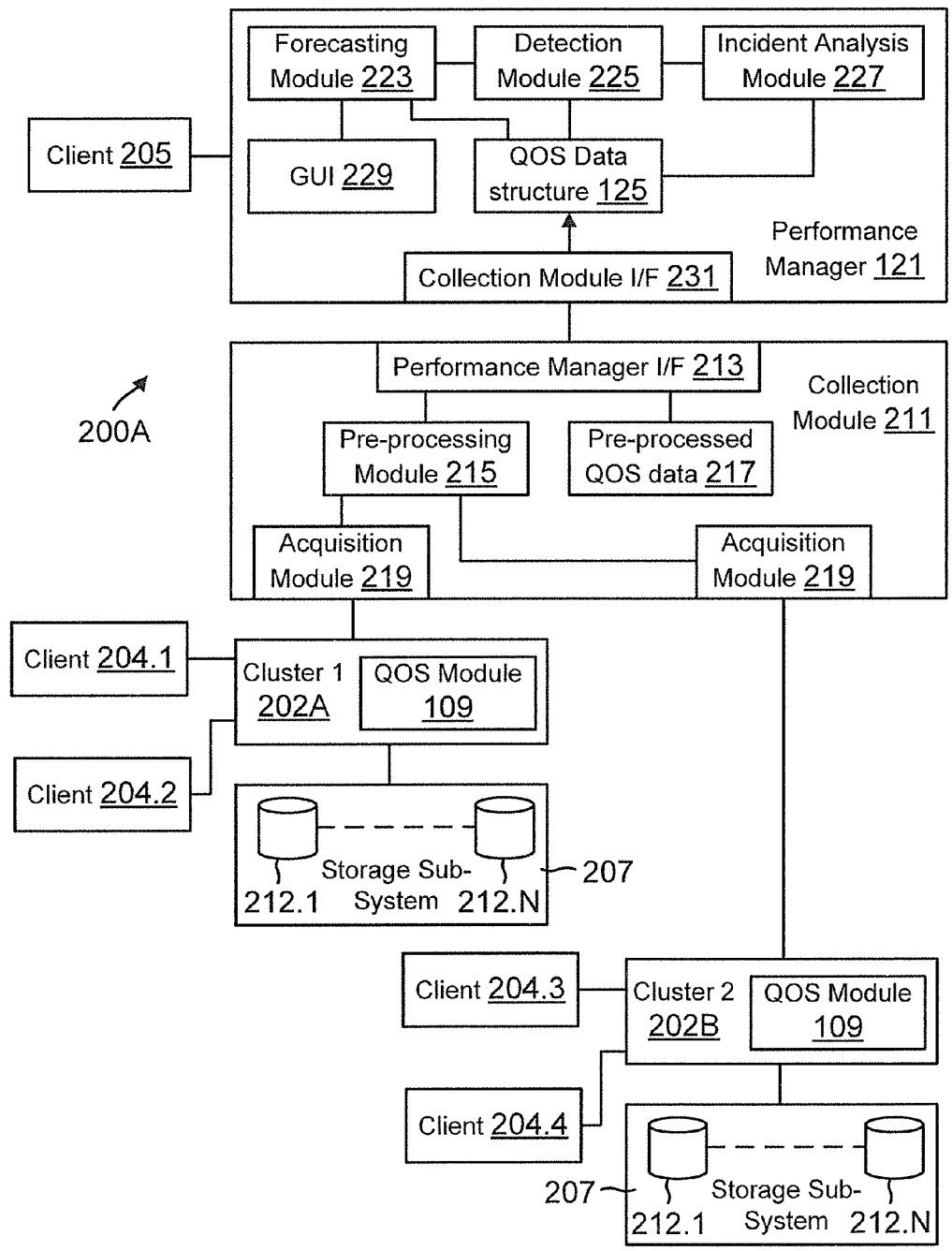
FIG. 2B shows an example of a performance manager for monitoring and analyzing QOS (quality of service) data, according to one aspect of the present disclosure.

Performance Manager 121:

FIG. 2B shows a block diagram of system 200A with details regarding performance manager 121 and a collection module 211, according to one aspect. Performance manager 121 uses the concept of workloads for tracking QOS data for incident detection and analysis. At a high level, workloads are defined based on incoming I/O requests and use resources within storage system 202 for processing I/O requests. A workload may include a plurality of streams, where each stream includes one or more requests issued by clients. A stream may include requests from one or more clients. An example, of the workload model used by performance manager 121 is shown in FIG. 2F and described below in detail.

Performance manager 121 collects a certain minimal amount of data (for example, QOS data for 3 hours or 30 data samples) of workload activity. After collecting the minimal QOS data, performance manager 121 generates an expected range (or threshold values) for future QOS data.

The expected range is a range of measured performance activity (or QOS data) of a workload over a period of time. For example, a given twenty-four hour period may be split into multiple time intervals. The expected range may be generated for each time interval. The expected range sets a baseline for what may be perceived to be typical activity for the workload. The upper boundary of the expected range establishes a dynamic performance threshold that changes over time. For example, during 9.00 AM and 5.00 PM most employees of a business check their email between 9.00 AM-10.30 AM. The increased demand on email servers means an increase in the workload activity at the storage managed by the storage operating system. The demand on the storage may decrease during lunch time. The performance manager 121 tracks this activity to determine the expected range or expected QOS data behavior for future activity.

Performance manager 121 uses the expected range to represent and monitor I/O response time and operations for a storage volume in a cluster. The performance manager 121 tracks QOS data and in some cases identifies abnormal activity as incidents. An incident indicates that workload performance is outside a desirable level due to resource contention from other workloads i.e. workloads with higher usage of cluster resources may be causing the response time to increase. Incidents are considered as events that indicate I/O performance issues at a storage volume caused by resource contention.

Performance manager 121 compares historical QOS data with current QOS data to identify a victim workload whose performance may have decreased. Victim workloads may be identified based on response time deviation from an expected response time, as described below. After identifying the victim, the performance manager 121 identifies the resource that may be in contention as well as the workloads (or volumes) that may be overusing the resources (i.e. bully workloads). Workloads are ranked to determine which bullies have the highest change in usage of the resource and which victims are most impacted. Based on the identification of victim and bully workloads, a remediation plan may be recommended to correct the problems associated with the incident.

Referring now to FIG. 2B, System 200A shows two clusters 202A and 202B, both similar to cluster 202 described above. Each cluster includes the QOS module 109 for implementing QOS policies that are established for different clients/applications.

Cluster 1 202A may be accessible to clients 204.1 and 204.2, while cluster 2 202B is accessible to clients 204.3/204.4. Both clusters have access to storage subsystems 207 and storage devices 212.1/212.N.

Clusters 202A and 202B communicate with a collection module 211. The collection module 211 may be a standalone computing device or integrated with performance manager 121. The aspects described herein are not limited to any particular configuration of collection module 211 and performance manager 121.

Collection module 211 includes one or more acquisition modules 219 for collecting QOS data from the clusters. The data is pre-processed by the pre-processing module 215 and stored as pre-processed QOS data 217 at a storage device (not shown). Pre-processing module 215 formats the collected QOS data for the performance manager 121. Pre-processed QOS data 217 is provided to a collection module interface 231 of the performance manager 121. QOS data received from collection module 211 is stored as QOS data structure 125 by performance manager 121 at a storage device (not shown).

Performance manager 121 includes a plurality of modules, for example, a forecasting module 223, a detection module 225 and an incident analysis module 227 that use the QOS data 125 for detecting incidents and reporting the incidents to a client system 205 via a GUI 229. Performance manager 121 also recommends a corrective action plan to client 205. Client 205 may access the analysis results and recommendations using GUI 229. Before describing the various processes involving performance manager 121 and its components, the following describes using the performance manager 121 in a cloud based computing environment.

Figure 2C:
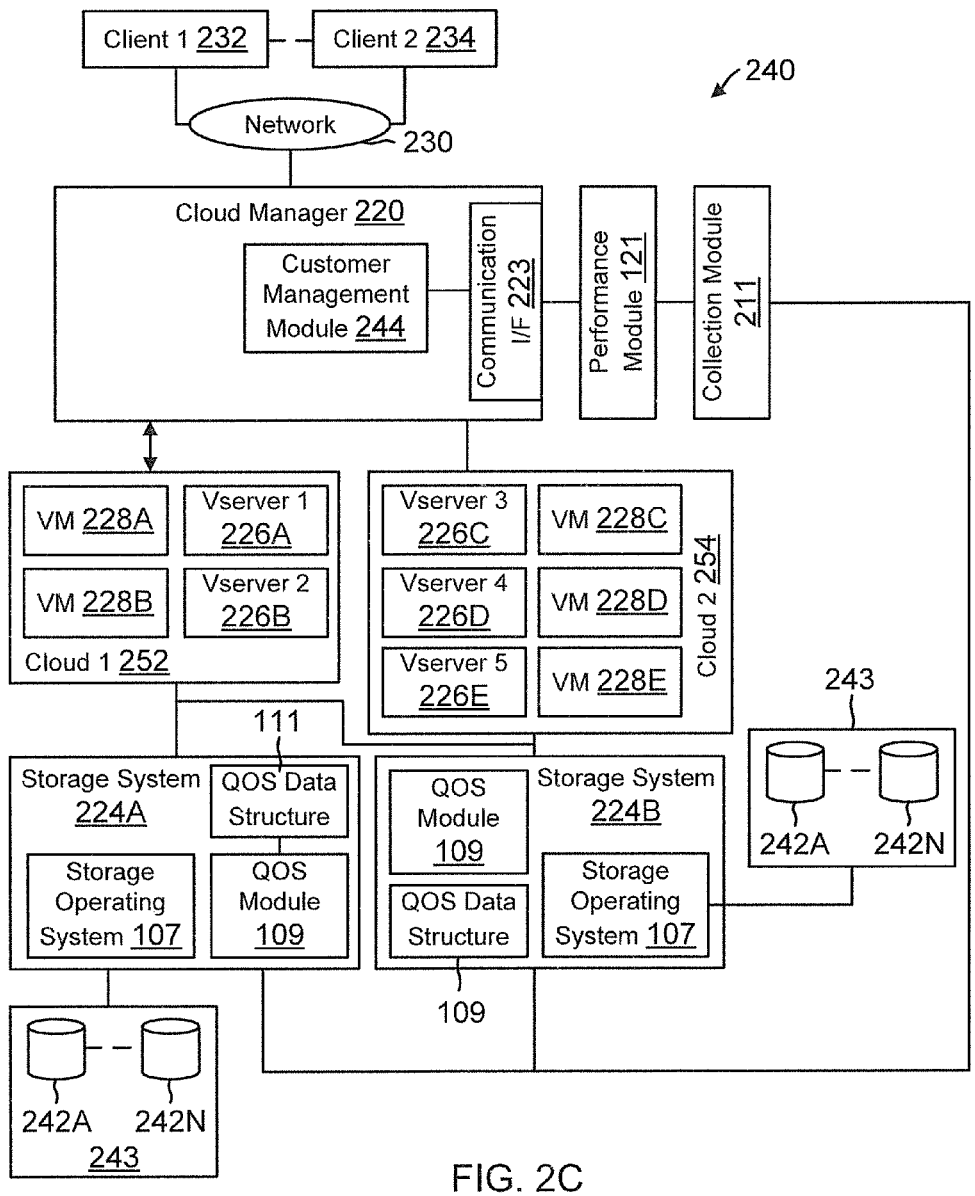
FIG. 2C shows an example of using the performance manager in a cloud computing environment, according to one aspect of the present disclosure.

Cloud Computing Environment:

FIG. 2C shows one or more storage system (or controllers) 224A/224B analogous to storage system 108/202 in a cloud computing environment 240, according to one or more aspects. In one or more aspects, cloud computing environment 240 may be a computing environment configured to enable network access (e.g., on-demand) to a shared pool of configurable computing resources (e.g., networks, storage, host servers, applications, services). In one or more aspects, a storage system may be a hardware resource configured to host one or more vservers in cloud computing environment 240.

Storage system 224A and storage system 224B may be deployed by a cloud manager 220 and/or a cloud administrator configured to provision the host systems, storage associated with one or more client devices (e.g., client 1 232, client 2 234) and/or services requested by the one or more client devices. As an example, storage system 224A may be configured to be associated with vserver 1 226A and vserver 3 226C. Storage system 224B may be configured to be associated with vserver 2 226B, vserver 4 226D and vserver 5 226E.

In one or more aspects, cloud manager 220 may enable one or more client devices to self-provision computing resources thereof. As an example, cloud manager 220 may manage cloud portion(s) (e.g., cloud 1 252, cloud 2 254) associated with client 1 232 and client 2 234. Client 1 232 and/or client 2 234 may log into a console associated with cloud manager 220 to access cloud 1 252 and/or cloud 2 254 (and the VMs 228A-228E therein) through a public network 230 (e.g., Internet). The client devices and/or VMs associated therewith provided in cloud computing environment 240 may be analogous to the clients of FIGS. 1/2A.

In order to address storage requirements/requests associated with client 1 232 and client 2 234, cloud manager 220 may be configured to appropriately provision vserver 1 226A, vserver 2 226B, vserver 3 226C, vserver 4 226D and vserver 5 226E and allocate to client 1 232 and client 2 234. The aforementioned vservers may be virtualized entities utilized by client 1 232 and client 2 234 to meet storage requirements thereof. Multi-tenancy may allow for a storage system to have multiple vservers associated therewith. A portion of the cloud (e.g., cloud 1 252) including vserver 1 226A, vserver 2 226B and VMs (e.g. VM 228A, VM 228B) associated therewith may be associated with client 1 232 and a portion of the cloud (e.g., cloud 2 254) including vserver 3 226C, vserver 4 226D and vserver 5 226E and VMs (e.g., VM 228C, VM 228D, VM 228E) associated therewith may be associated with client 2 234. In one or more aspects, VMs may reside on storage exposed by vserver(s).

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232 and/or client 2 234 may be entities (e.g., corporations, departments and others), and that there may be a number of computing devices associated with each of client 1 232 and/or client 2 234.

Cloud 1 252 and/or cloud 2 254 may span across several geographic regions. In one or more aspects, the aforementioned cloud portions may span multiple countries under differing jurisdictional guidelines. For example, a jurisdictional guideline may deem that a vserver needs to be launched on hardware (e.g., storage system) located in the same jurisdiction as the corresponding client(s).

In one or more aspects, administrators of cloud computing environment 240 may possess the authority to launch one or more vservers on any of storage system 224A and storage system 224B, irrespective of the location(s) thereof. Further, in one or more aspects, the aforementioned one or more vservers may be associated with one or more versions of storage operating system 107. For example, an administrator may modify the version of the storage operating system and/or configuration settings on storage system 224A and/or storage system 224B.

In one aspect, cloud computing environment 240 includes the performance manager 121 and the collection module 211 that have been described above. The various processes executed by the performance manager 121 and the collection module 211 are described below.

Figure 2D:
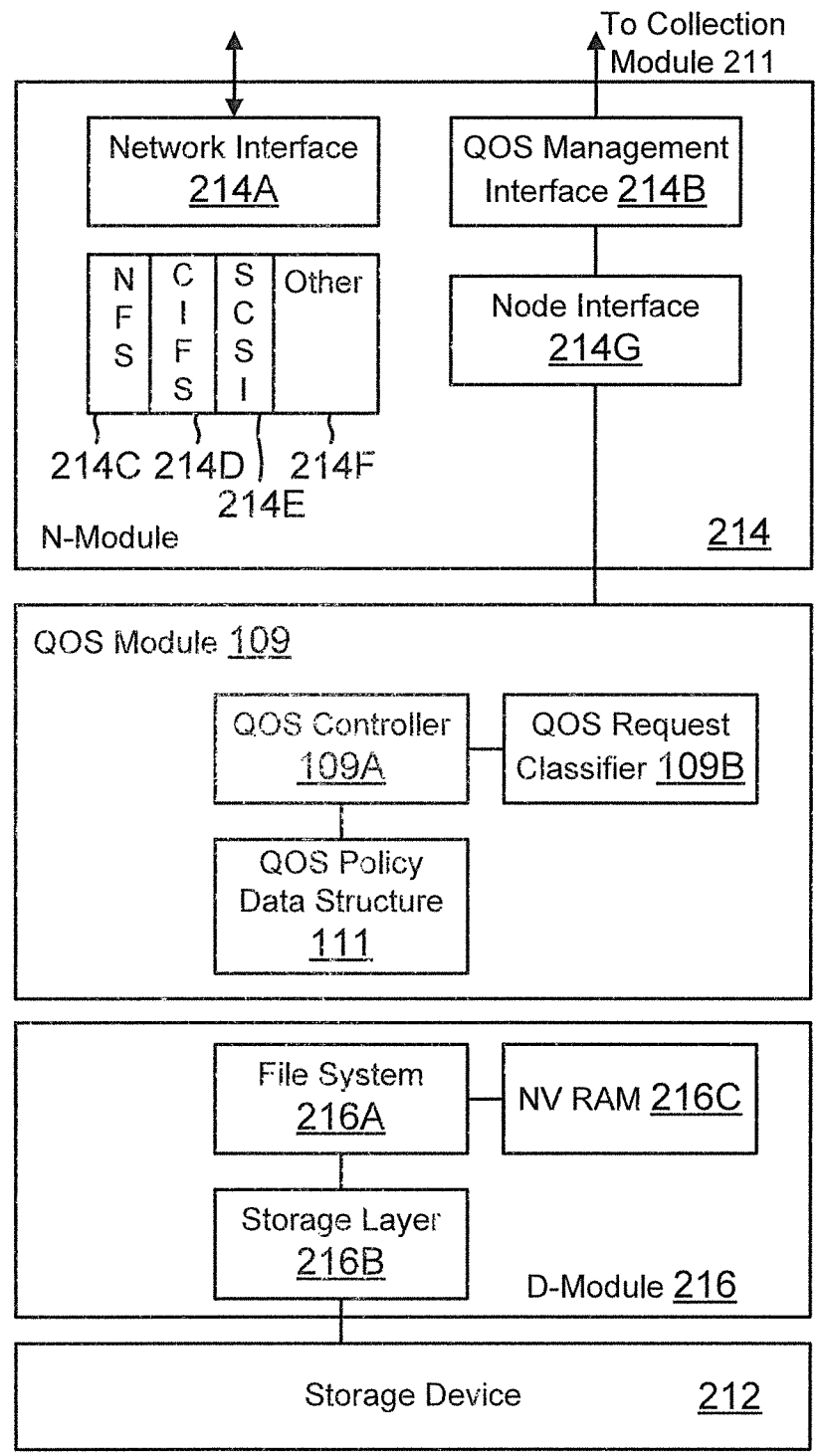
FIG. 2D shows an example of handling QOS requests by a storage system, according to one aspect of the present disclosure.

Before describing the various processes executed by the performance manager 121, the following describes how QOS requests are handled at the cluster level with respect to FIG. 2D. The N-Module 214 of a cluster includes a network interface 214A for receiving requests from clients. N-Module 214 executes a NFS module 214C for handling NFS requests, a CIFS module 214D for handling CIFS requests, a SCSI module for handling iSCSI requests and an others module 214F for handling "other" requests. A node interface 214G is used to communicate with QOS module 109, D-Module 216 and/or another N-Module 214. QOS management interface 214B is used to provide QOS data from the cluster to collection module 211 for pre-processing, as described below.

QOS module 109 includes a QOS controller 109A, a QOS request classifier 109B and QOS policy data structure (or Policy_Group) 111. The QOS policy data structure 111 stores policy level details for implementing QOS for clients and storage volumes. The policy determines what latency and throughput rate is permitted for a client as well as for specific storage volumes. The policy determines how I/O requests are processed for different volumes and clients.

The D-Module 216 executes a file system 216A (a part of storage operating system 107 described below) and includes a storage layer 216B to interface with storage device 212. NVRAM 216C of the D-Module 216 may be used as cache for responding to I/O requests.

A request arrives at N-Module 214 from a client or from an internal process directly to file system 216A. Internal process in this context may include a de-duplication module, a replication engine module or any other entity that needs to perform a read and/or write operation at the storage device 212. The request is sent to the QOS request classifier 109B to associate the request with a particular workload. The classifier 109B evaluates a request's attributes and looks for matches within QOS policy data structure 111. The request is assigned to a particular workload, when there is a match. If there is no match, then a default workload may be assigned.

Once the request is classified for a workload, then the request processing can be controlled. QOS controller 109A determines if a rate limit (i.e. a throughput rate) for the request has been reached. If yes, then the request is queued for later processing. If not, then the request is sent to file system 216A for further processing with a completion deadline. The completion deadline is tagged with a message for the request.

File system 216A determines how queued requests should be processed based on completion deadlines. The last stage of QOS control for processing the request occurs at the physical storage device level. This could be based on latency with respect to storage device 212 or for NVRAM 216C that may be used for any logged operation.

Figure 2E:
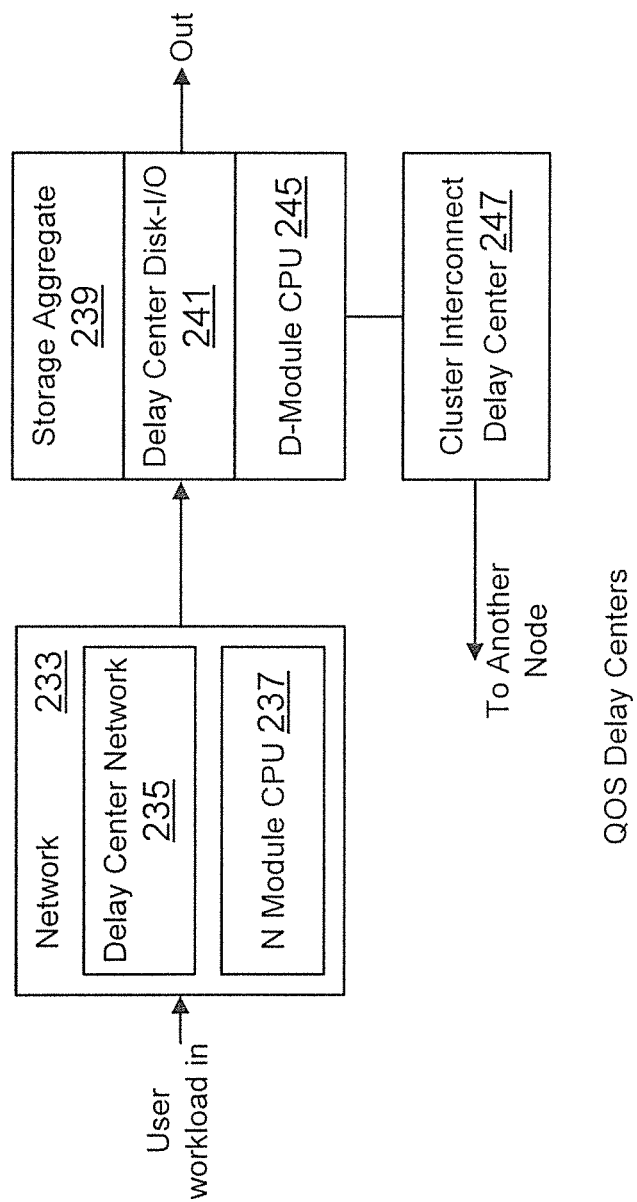
FIG. 2E shows an example of a resource layout used by the performance manager, according to one aspect of the present disclosure.
Figure 2F:
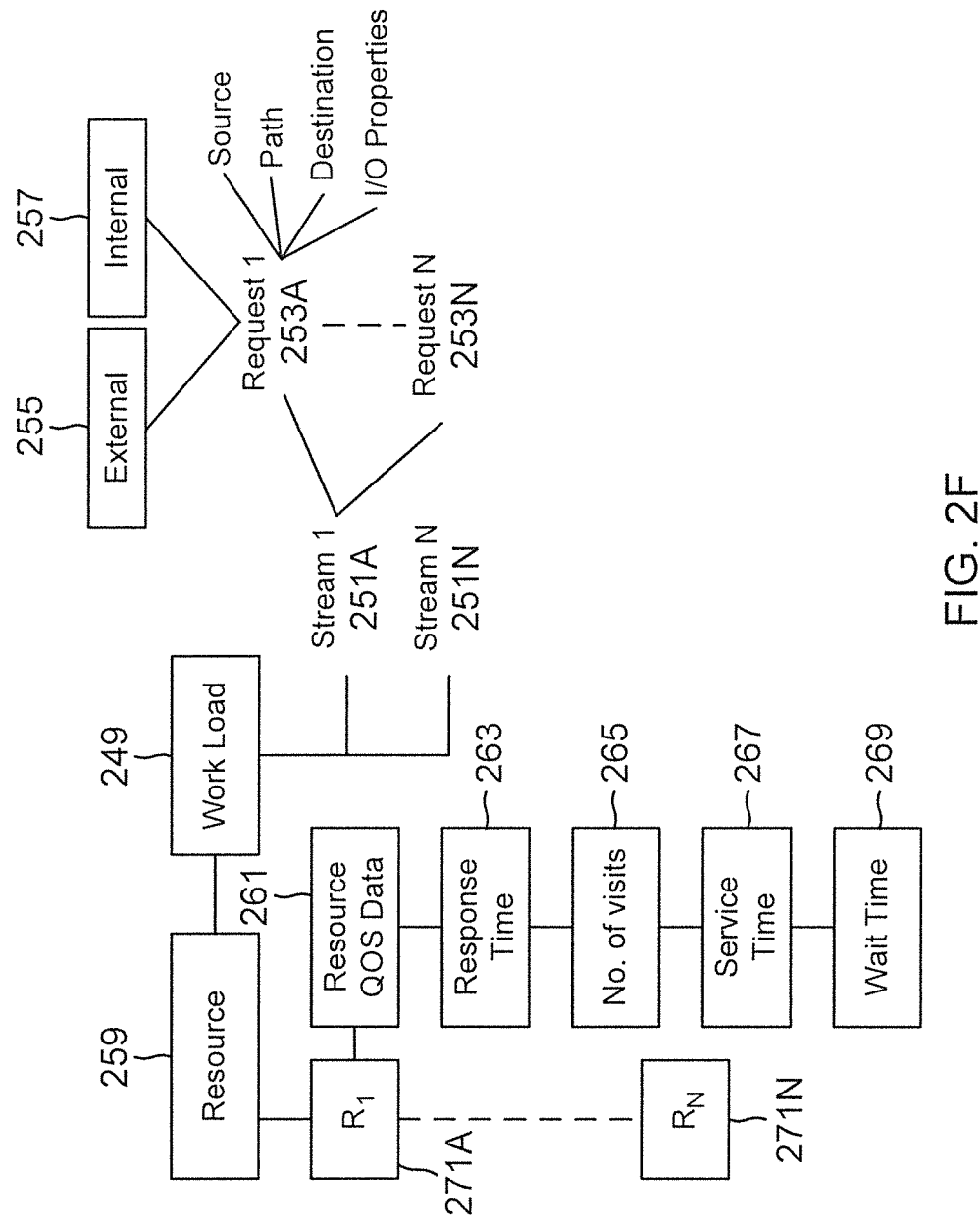
FIG. 2F shows an example of managing workloads and resources by the performance manager, according to one aspect of the present disclosure.

Performance Model:

FIG. 2E shows an example of a queuing network used by the performance manager 121 for detecting incidents and performing incident analysis, according to one aspect. A user workload enters the queuing network from one end (i.e. at 233) and leaves at the other end.

Various resources are used to process I/O requests. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, the QOS data includes a number of visits, wait time per visit and service time per visit for incident detection and analysis. For the delay center, only the number of visits and the wait time per visit at the delay center are used, as described below in detail.

Performance manager 121 uses different flow types for incident detection and analysis. A flow type is a logical view for modeling request processing from a particular viewpoint. The flow types include two categories, latency and utilization. A latency flow type is used for analyzing how long operations take at the service and delay centers. The latency flow type is used to identify a victim workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention and a bully workload as described below in detail.

Referring now to FIG. 2E, delay center network 235 is a resource queue that is used to track wait time due to external networks. Storage operating system 107 often makes calls to external entities to wait on something before a request can proceed. Delay center 235 tracks this wait time.

N-Module CPU 237 is another resource queue where I/O requests wait for protocol processing by an N-Module processor. A separate queue for each node may be maintained.

A storage aggregate (or aggregate) 239 is a resource that may include more than one storage device for reading and writing information. Disk-I/O 241 queue may be used to track utilization of storage devices 212. A D-Module CPU 245 represents a processor that is used to read and write data. The D-Module CPU 245 is a service center and a queue is used to track the wait time for any writes to storage devices by a D-Module processor.

storage devices and this will typically cause other write requests to be blocked so that certain buffers are cleared.

Without limiting the various aspects of the present disclosure, Table I below provides an example of the various service and delay centers that may be used by performance manager 121 to track workload performance using different resources. Some of these resources are shown in FIG. 2E. Table I also identifies the resource type (i.e. utilization and/or latency type).

TABLE I

| Resource Name | Resource Description | Type |
| --- | --- | --- |
| CPU_N_Module (234, FIG. 2E) | This resource identifies a queue where I/O requests wait for file protocol processing at an N-Module 214. As an example, there may be one queue for each node. | Utilization, Latency |
| CPU_D_Module (245, FIG. 2E) | This resource identifies a queue where I/O requests wait for scheduling for being written to a storage device by the D-Module 216. As an example, there may be one queue for each node. | Utilization, latency |
| DISK_HDD_<Aggr_name> (241, FIG. 2E) | This resource represents non-solid state physical storage devices in an aggregate, for example, hard drives, tapes and others. This provides an average view across all storage devices within an aggregate. As an example, there may be one queue for each aggregate to track this resource. | Utilization |
| DISK_SSD_<aggr_name> (Similar to 241, FIG. 2E) | This resource is similar to 241, and represents physical solid state storage devices (SSDs) in an aggregate. This provides an average view across all storage devices within the aggregate. As an example, there may be one queue for each aggregate to track this resource. | Utilization |
| DELAY_CENTER_WAFL_SUSP_DISKIO | This is a queue to represent the wait time for blocked disk I/O related file system suspensions. | Latency |
| DELAY_CENTER_WAFL_SUSP_CP | This is a queue to represent wait time for Consistency Point (CP) related suspensions by the file system. A CP will cause write requests to a block so that buffers can be cleared. | Latency |
| DELAY_CENTER_NETWORK (235, FIG. 2E) | This is a queue that represents an external network wait time. At times, storage operating system 107 calls out an external entry to wait on something outside of the storage operating system to complete before the request can continue and this queue is used to track that wait time. There may be one delay center for an entire cluster. | Latency |
| DELAY_CENTER_CLUSTER_INTERCONNECT (247, FIG. 2E) | This queue is used to represents the wait time for transfers over a cluster interconnect. As an example, there may be one queue per cluster. | Latency |

Nodes within a cluster communicate with each other. These may cause delays in processing I/O requests. The cluster interconnect delay center 247 is used to track the wait time for transfers using the cluster interconnect system. As an example, a single queue maybe used to track delays due to cluster interconnects.

There may also be delay centers due to certain internal processes of storage operating system 107 and various queues may be used to track those delays. For example, a queue may be used to track the wait for I/O requests that may be blocked for file system reasons. Another queue (Delay_Center_Susp_CP) may be used to represent the wait time for Consistency Point (CP) related to the file system 216A. During a CP, write requests are written in bulk at Workload Model:

FIG. 2F shows an example, of the workload model used by performance manager 121, according to one aspect. As an example, a workload may include a plurality of streams 251A-251N. Each stream may have a plurality of requests 253A-253N. The requests may be generated by any entity, for example, an external entity 255, like a client system and/or an internal entity 257, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol.

A destination is the target of a request, for example, storage volumes, LUNs, data containers and others.

I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload. Furthermore, requests that fall into a workload are tracked together by performance 121 for efficiency. Any requests that don't match a user or system defined workload may be assigned to a default workload.

In one aspect, workload streams may be defined based on the I/O attributes. The attributes may be defined by clients. Based on the stream definition, performance manager 121 tracks workloads, as described below.

Referring back to FIG. 2F, a workload uses one or more resources for processing I/O requests shown as 271A-271N as part of a resource object 259. The resources include service centers and delay centers that have been described above with respect to FIG. 2E and Table I. For each resource, a queue is maintained for tracking different statistics (or QOS data) 261. For example, a response time 263, and a number of visits 265, a service time (for service centers) 267 and a wait time 269 are tracked. The term QOS data as used throughout this specification includes one or more of 263, 265, 267 and 269 according to one aspect.

Without limiting the various aspects of the present disclosure, Table II below provides an example of a non-exhaustive listing of the various objects that are used by the performance manager 121 for incident detection and analysis, where each object may have multiple instances:

TABLE II

| Object | Instance | Purpose | Description |
|---|---|---|---|
| Workload | <workload_name> | Represents an external workload applied to a volume. The object may be used to measure workload performance against service levels. | Throughput, Average response time |
| Resource | <resource_name> | Provide hierarchical utilization of resources and may be a service or delay center. | Utilization |
| Resource_detail | <resource_name>. <workload_name> | Breakdowns resource usage by workload from a resource perspective. | Utilization |
| Workload_detail | <workload_name>. <service_center_name> | Breakdowns workload response time by resource. | Number of visits, service time per visit and wait time per visit |

Performance manager 121 also uses a plurality of counter objects for incident detection and analysis. Without limiting the adaptive aspects, an example of the various counter objects are shown and described in Table III below:

TABLE III

| Workload Object Counters | Description |
|---|---|
| Ops | A number of workload's operations that are completed during a measurement interval, for example, a second. |
| Read_ops | A number of workload read operations that are completed during the measurement interval. |
| Write_ops | A number of workload write operations that are completed during the measurement interval. |
| Total_data | Total data read and written per second by a workload. |
| Read_data | The data read per second by a workload. |
| Write_data | The data written per second by a workload. |
| Latency | The average response time for I/O requests that were initiated by a workload. |
| Read_latency | The average response time for read requests that were initiated by a workload. |
| Write_latency | The average response time for write requests that were initiated by a workload. |
| Latency_hist | A histogram of response times for requests that were initiated by a workload. |
| Read_latency_hist | A histogram of response times for read requests that were initiated by a workload. |
| Write_latency_hist | A histogram of response times for write requests that were initiated by a workload. |
| Wid | A workload ID. |
| Classified | Requests that were classified as part of a workload. |
| Read_IO_type | The percentage of reads served from various components (for example, buffer cache, ext_cache or disk). |

TABLE III-continued

| Workload Object Counters | Description |
| --- | --- |
| Concurrency | Average number of concurrent requests for a workload. |
| Interarrival_time_sum_squares | Sum of the squares of the Inter-arrival time for requests of a workload. |
| Policy_group_name | The name of a policy-group of a workload. |
| Policy_group_uuid | The UUID (unique indetifier) of the policy-group of a workload. |
| Data_object_type | The data object type on which a workload is defined, for example, one of vserver, volume, LUN, file or node. |
| Data_object_name | The name of the lowest-level data object, which is part of an instance name as discussed above. When data_object_type is a file, this will be the name of the file relative to its volume. |
| Data_object_uuid | The UUID of a vserver, volume or LUN on which this data object is defined. |
| Data_object_file_handle | The file handle of the file on which this data object is defined; or empty if data_object_type is not a file. |

Without limiting the various aspects of the present disclosure, Table IV below provides an example of the details associated with the object counters that are monitored by the performance manager 121 for detecting incidents, according to one aspect:

TABLE IV

| Workload Detail Object Counter | Description |
| --- | --- |
| Visits | A number of visits to a physical resource per second; this value is grouped by a service center. |
| Service_Time | A workload's average service time per visit to the service center. |
| Wait_Time | A workload's average wait time per visit to the service center. |

When a workload is responding slowly, a user may want to analyze the workload to determine the root cause of any issues and then perform corrective action to solve the issues. Performance manager 121 using QOS data collected from the different clusters and using the workload performance model detects such issues as incidents and then provides remedial actions.

Performance manager 121 uses collected QOS data to predict dynamic threshold values for workloads. Using the dynamic threshold values and statically defined threshold values, detection module 225 detects one or more incidents. The incident analysis module 227 then determines which resource may be in contention for a victim workload and identifies any bully workloads that may have caused the incident.

Figure 3A:
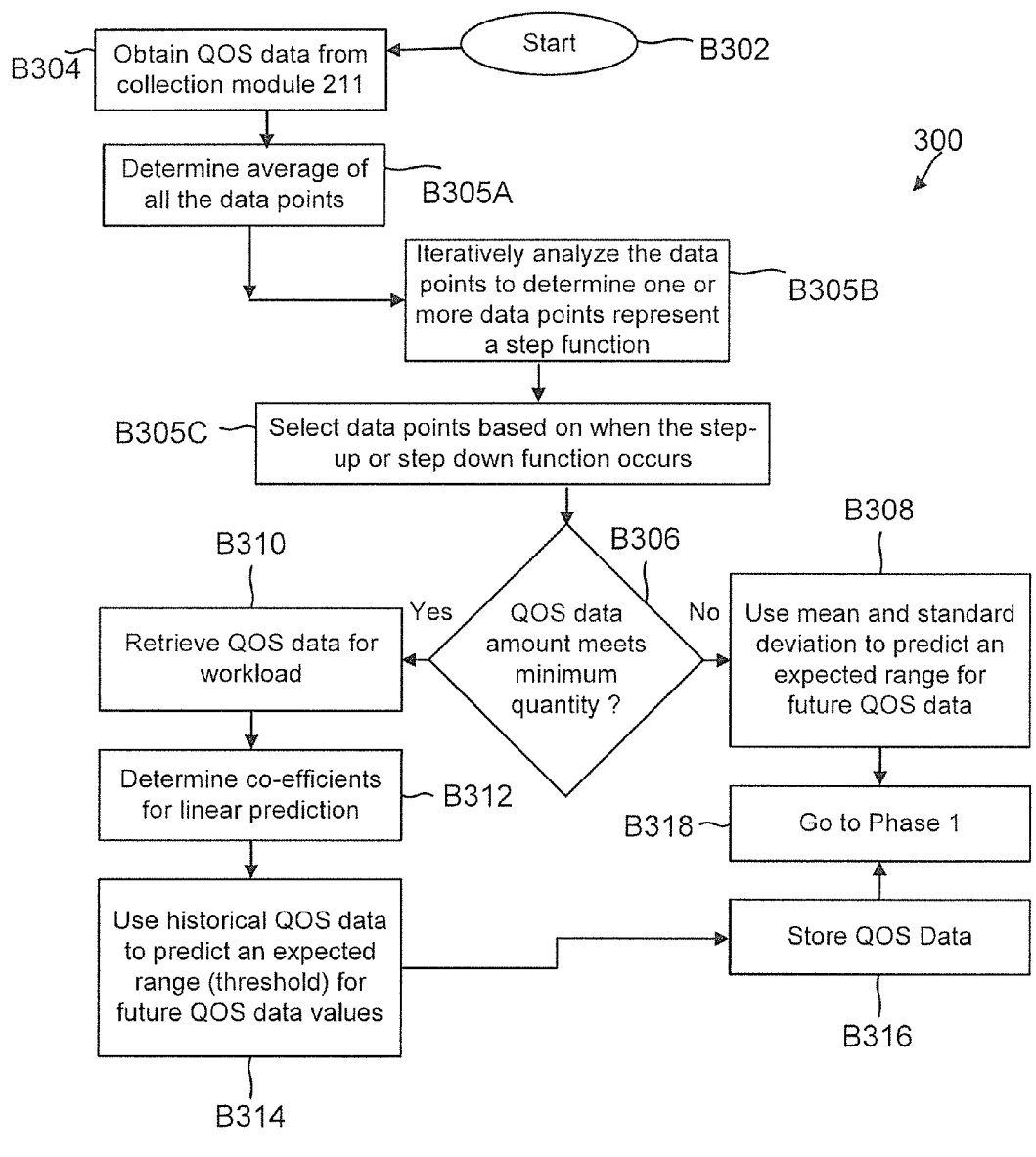
FIG. 3A shows an example of Phase 0 of the detection and analysis process, according to one aspect of the present disclosure.
Figure 4:
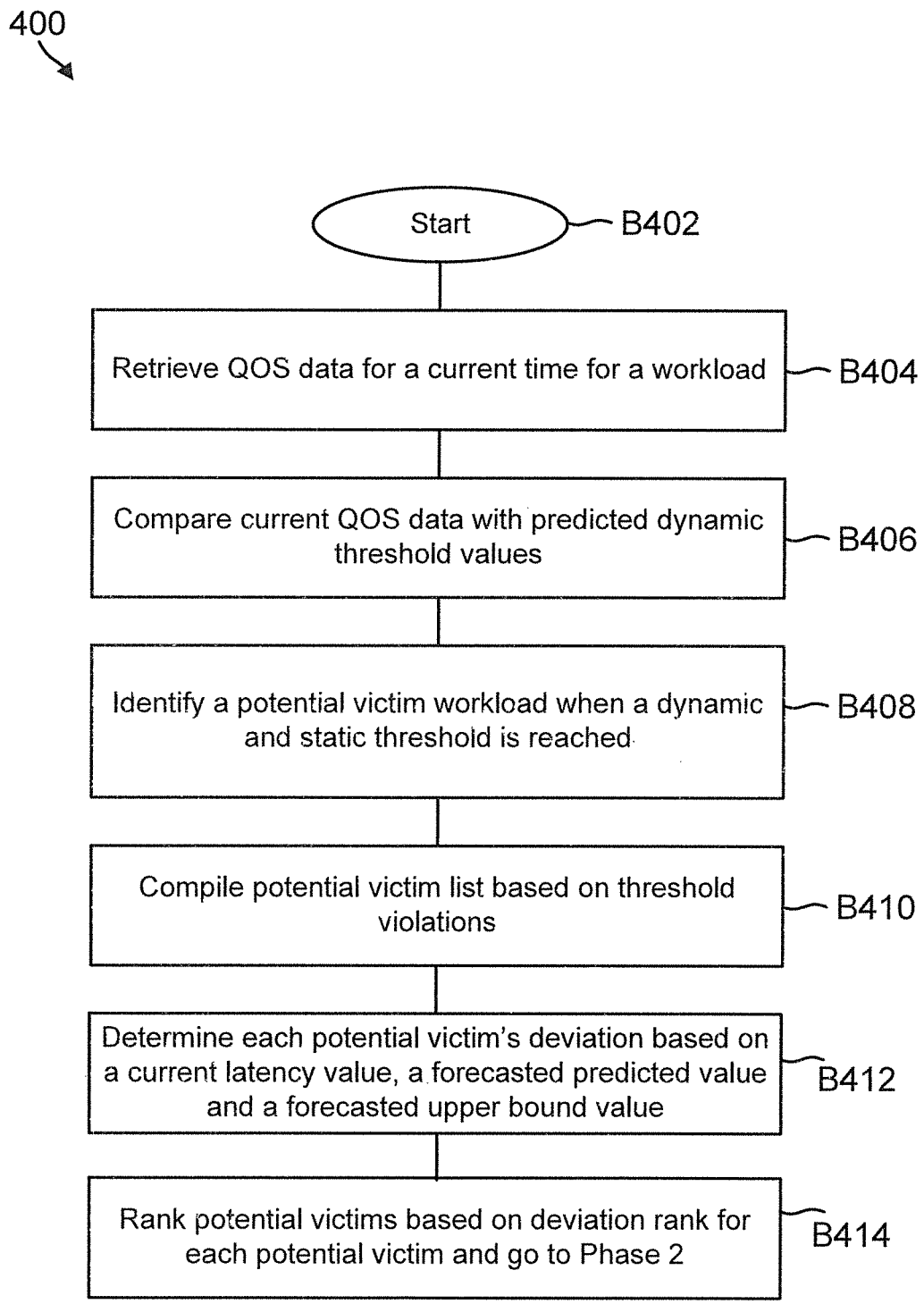
FIG. 4 shows an example of Phase 1 of the detection and analysis process, according to one aspect of the present disclosure.
Figure 5:
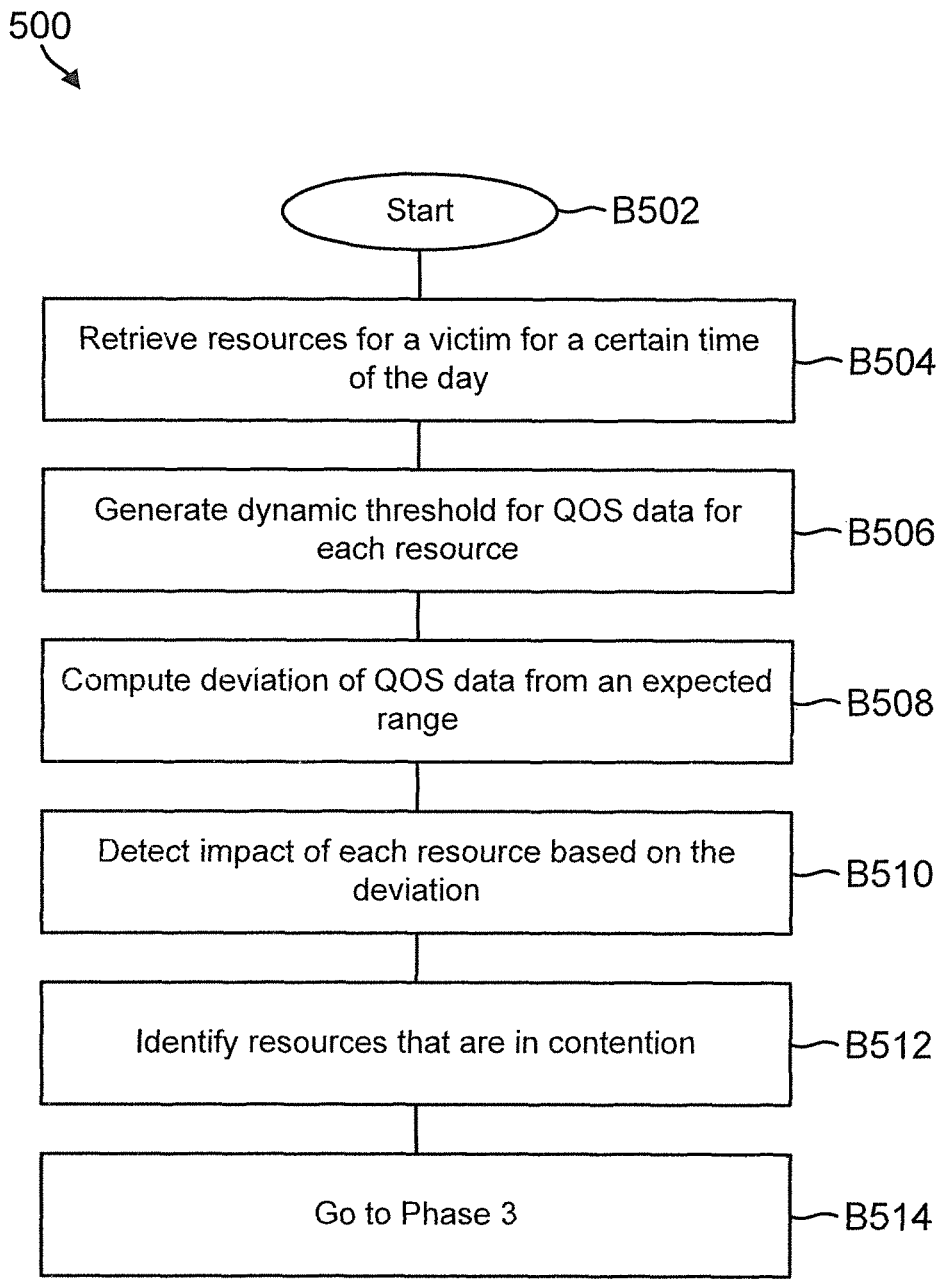
FIG. 5 shows an example of Phase 2 of the detection and analysis process, according to one aspect of the present disclosure.
Figure 6A:
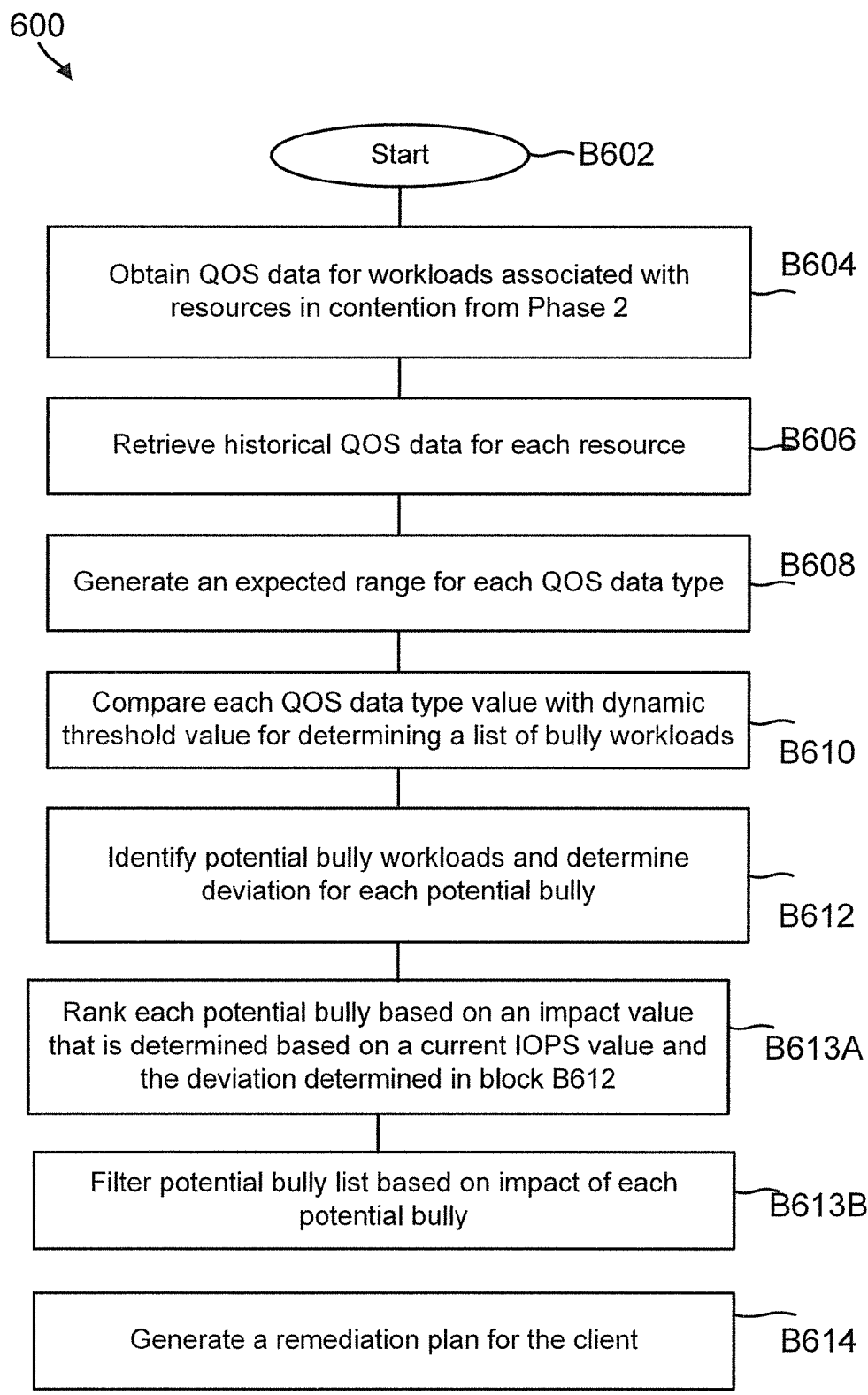
FIG. 6A shows an example of Phase 3 of the detection and analysis process, according to one aspect of the present disclosure.

The detection and analysis may be a part of a multi-phase process, for example, Phase 0-Phase 3. Phase 0 shown in FIG. 3A is used to collect base-line data to provide an expected range for QOS data behavior. Phase 1 shown in FIG. 4 is used to detect a victim workload, while Phase 2 shown in FIG. 5 is used to detect the resource that is in contention. Phase 3 shown in FIG. 6A is used to detect the bully workload.

The various phases are based on QOS data that is collected periodically by performance manager 121. In one aspect, an average response time for a workload, number of visits to a service center, response time at a service or delay center per operation, average service time at a service or a delay center and average wait time at a service center or a delay center per operation (individually or jointly referred to as QOS data) or a number of operations performed by a workload are used to detect and analyze an incident.

Process Flow (Phase 0):

FIG. 3A shows a process 300 for Phase 0 to establish a baseline and an expected range for QOS data for different workloads, according to one aspect. The process begins in block B302 when performance manager 121, collection module 211 and the various storage clusters are all operational.

In block B304, performance module 121 obtains QOS data from collection module 211. The QOS data regarding one or more clusters is initially collected by the QOS module 109 based on the configuration of the service centers and delay centers that are involved in processing I/O requests for each workload. The QOS data includes response time, service time per visit, wait time per visit, the number of visits within a duration (for example, a second) and a number of operations performed by a workload. These terms have been described above in detail. The QOS data is pre-processed by the collection module 211 and then provided to performance module 121.

In block B305A, the forecasting module 223 first obtains an average of different components of QOS data, for example, response time. Assume that there are N number of data points that can be used for the process blocks described below. The data points may be represented by $D=[D_0, D_1 \ldots D_{N-1}]$. Assume that M is a minimum number of data points that are needed for executing the prediction process blocks B312 and B314, described below in detail. The average "A" may be represented by $D_k$.

In block B305B, each data point is iteratively analyzed to determine if a step function has occurred. A step function occurs when there is a sudden increase or decrease of a data value over time. As an example, the analysis starts by using a most recent data point as a fixed point of comparison. The process starts with the most recent data and steps back in time to find a longest subset of data that does not cross the mean value. To determine this, a variable P is used. As an example, for the most recent data point $P=(D_{N-1}-A)*(D_{N-k-1}-A)$. When k=1, $P=(D_{N-1}-A)*(D_{N-2}-A)$.

In block B305B, the process determines if P is less than 0 i.e. if P is a negative number. If P is not a negative number, then the process iterates to the next value, i.e. k=1, until k reaches the value of N. If P is less than 0, then the process determines if the value of k is greater than M, the minimum number of data points that are used herein for prediction.

Figure 3B:
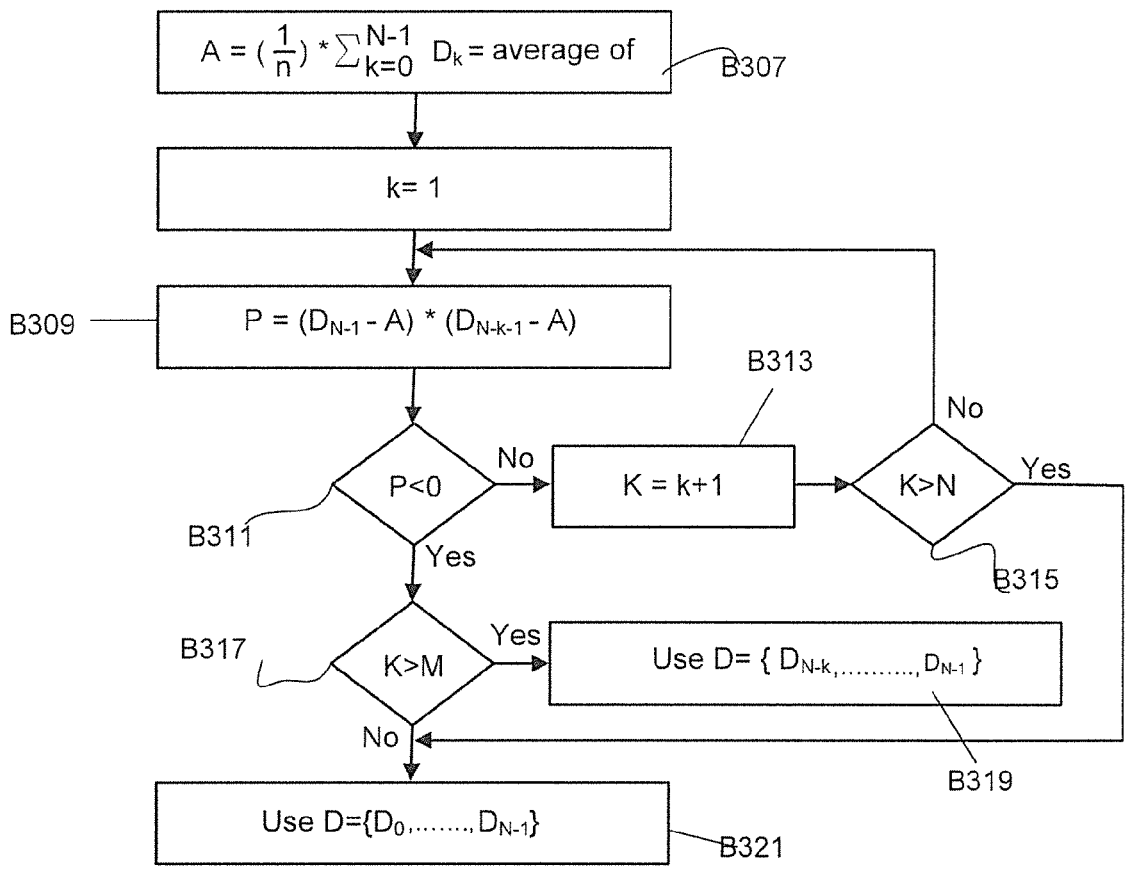
FIG. 3B shows an example of a process for determining step-up or step-down function for phase 0 of FIG. 3A, according to one aspect of the present disclosure.

In block B305C, the process selects data points based on when the step-up of step-down function occurs. For example, if k is > than M, then the process uses data points represented by ($D_{N-k} \ldots D_{N-1}$), otherwise, use [$D_0, D_1 \ldots D_{N-1}$]. The process blocks B305A-B305C are also shown in FIG. 3B.

The average A for N data points is shown in block B307. The first analysis for determining P, when k=1, is shown in block B309. In block B311, the process determines if P is less than 0. If not, then in block B313, the value of k is increased by 1. In block B315, if k is less than N, then the process goes back to block B309, otherwise, the process moves to block B321, described below.

If in block B311, if B is less than 0, then in block B317, the process determines if k is greater than M, the minimum number of acceptable data points. If yes, then in block B317, the filtered data points are used. If not, then in block B321, the entire data set is used.

In one aspect the process blocks B305A-B305C (and B307-B321) reduce the amount of data that needs to be analyzed. The process blocks also eliminate data points that represent anomalies and hence may affect the accuracy of predicted values.

Referring back to FIG. 3A, in block B306, the forecasting module 223 determines if the amount of collected QOS data meets a minimal quantity for predicting an expected range. For example, the forecasting module 223 may be configured to use at least three days of data for executing a forecasting operation to provide the expected range. If the amount of data does not meet the minimum requirement, then in block B308, the forecasting module 223 takes a mean of the collected QOS data that may be available and the standard deviation to provide an expected range. The process then moves to block B318.

If the minimum amount of QOS data is available, then in block B310, the QOS data for one or more workload is retrieved by the forecasting module 223. The QOS data may be stored at a storage location that is accessible directly or indirectly by forecasting module 223.

In block B312, forecasting module 223 determines coefficients for predicting an expected range. In one aspect, a linear prediction mathematical model may be used to provide the expected range using coefficients for the collected QOS data 125. An example of the linear prediction mathematical model is provided below:

Prediction:
Given $y_0, y_1, y_2, y_3, \ldots, y_{n-1}$
Solve for $d_j$, $y_n = \sum_{j=1}^{n} d_j y_{n-j} + x$
Minimize mean square error $$\left\langle \left( y_n - \sum_{j=1}^{n} d_j y_{n-j} \right)^2 \right\rangle =$$

$$= \left\langle \left( y_n^2 - 2\sum_{j=1}^{n} d_j y_n y_{n-j} + \sum_{j,k} d_j d_k y_{n-j} y_{n-k} \right) \right\rangle$$

$$= \langle y_n^2 \rangle - 2\sum_{j=1}^{n} d_j \langle y_n y_{n-j} \rangle + \sum_{j,k} d_j d_k \langle y_{n-j} y_{n-k} \rangle$$

Take derivative wrt $d_j$:

$$-2\langle y_n y_{n-j} \rangle + 2\sum_k d_k \langle y_{n-j} y_{n-k} \rangle = 0$$

-continued $$\sum_k d_k \langle y_{n-j} y_{n-k} \rangle = \langle y_n y_{n-j} \rangle$$

$$\sum_k d_k \gamma(|j-k|) = \gamma(j)$$

In the above description, angle brackets indicate statistical averages. The gamma function stands for autocorrelation. A certain amount of QOS data (for example, 15 days' of data) may be used to calibrate the linear prediction model. The data is used to solve for the coefficients (d) in the above equations. The coefficients are used to predict the future expected range for future QOS data values, for example, for the next 24 hours.

Along with the prediction as described below in detail, the process provides threshold values for normal behavior. To compute the threshold band, coefficients are applied to data for certain number of days, for example, 15 days of collected data. The process computes the absolute value of the difference between predicted and actual values. The coefficients may be applied one day at a time. The threshold values at a given point are produced from a weighted average of the difference values taken at points with the same phase as the given point with respect to the 24 hour period. So, for example, if the given point is at 1:00 AM, then the absolute value of the differences at 1:00 AM for 14 days is averaged. For a 15 day cycle, the first day is excluded since it is used to predict the second day, but has no matching prediction data. A weighting scheme may be used to give more importance to recent data points. For example, the weighting scheme may be as follows:

9/(N*N))*(i*i)+1 to the ith element in the sum, where N is the length of the period (N=288 points for 24 hours' worth of 5 minute intervals). Hence the weight goes approximately from 1 to 10 as the data index i goes from zero to N−1.

It is noteworthy that the linear prediction mathematical model described above is one technique to predict future behavior. Other mathematical techniques, for example, Kalman filter (linear quadratic estimation), may be used to provide the expected range and the threshold values.

In block B314, the performance manager 121 uses the coefficient and historical QOS data to predict the expected range for future QOS data for each workload. The expected range provided a dynamic threshold band (also referred to as the guard band) that can be used to detect abnormal QOS data. The threshold values can be adjusted as more data becomes available over a period of time. The historical QOS data is stored at a storage device in block B316 and the process moves to block B318 that is described below with respect to FIG. 4.

Figure 3C:
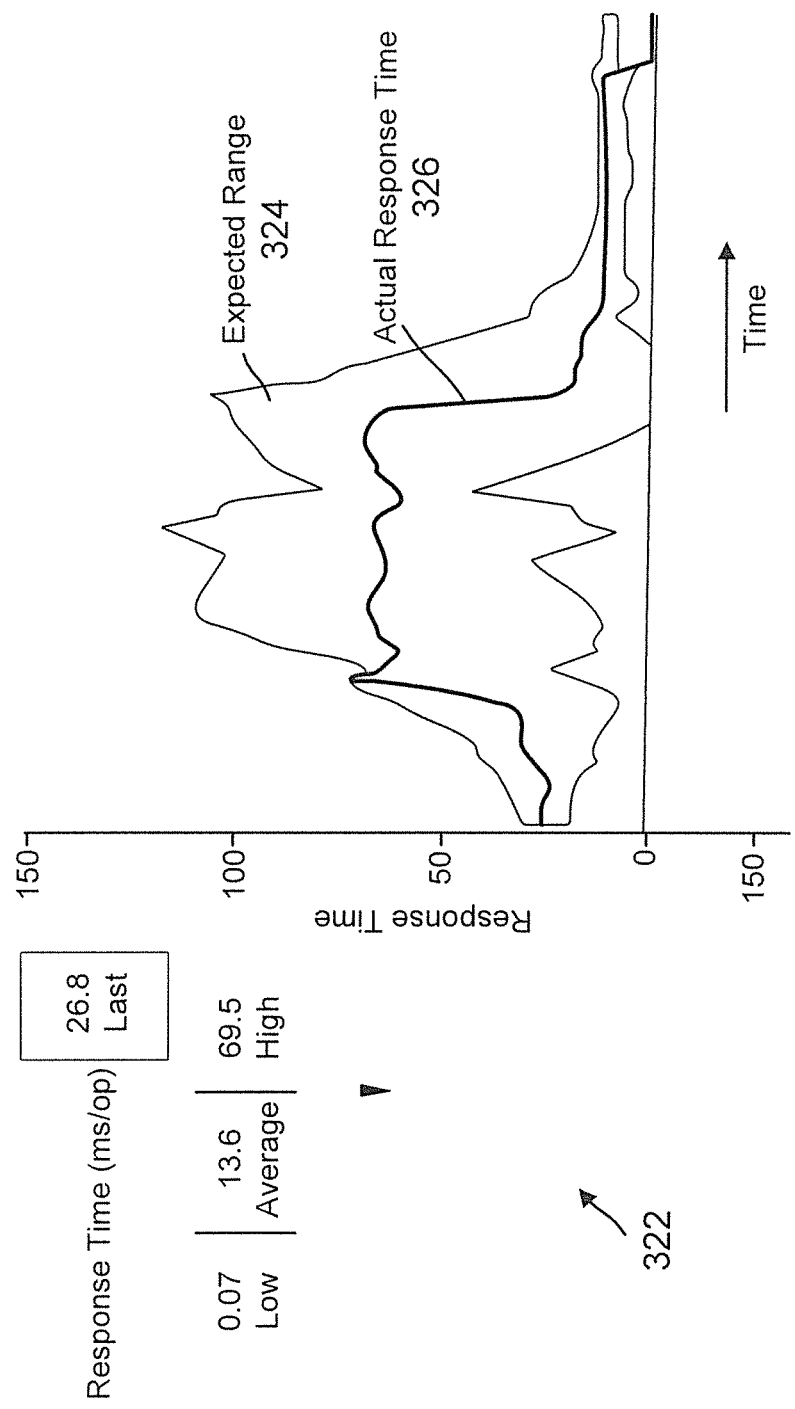
FIG. 3C shows an example of an expected range, generated by the performance manager, according to one aspect of the present disclosure.

FIG. 3C provides a graphical illustration 322 of an expected range for response time for a workload. In FIG. 3C, the response time measured in milliseconds per I/O operation is provided on the Y axis, while the time is provided in the X-axis. Actual response time is shown as 326 while the gray region 324 provides the expected range based on historically collected QOS data. The expected range 324 of FIG. 3C is used as a tool by detection module 225 for detecting abnormalities, as described below in detail.

Process Flow (Phase 1):

FIG. 4 shows process 400 for Phase 1 for detecting a victim workload (or storage volume), according to one aspect. A workload is considered to be a victim if it crosses a set of predefined static thresholds and its response time to process a request reaches a dynamic threshold value. The static threshold may be programmed for each storage volume using a management application. The dynamic threshold is based on the guard bands that have been described above with respect to FIGS. 3A and 3B. In one aspect, thresholds for a particular time may be generated on a daily basis to determine if a workload is a victim.

Process 400 begins in block B402 every time a new set of QOS data is collected and when the performance manager 121 has collected a minimal amount of QOS data for providing an expected range in Phase 0, as described above.

In block B404, the detection module 225 retrieves QOS data for a current time for a workload. The data may be obtained from the storage operating system 107 in real time.

In block B406, the current QOS data is compared with the dynamic threshold values that are determined for the current time based on historical QOS data. This allows the detection module 225 to determine if the current QOS data for the workload is acceptable when compared with historical expected behavior depicted by the expected range.

In block B408, one or more workload is identified as a potential victim, when both the dynamic threshold and the static threshold values are reached (i.e. violated). In another aspect, a workload may be declared as a potential victim when either the dynamic or the static threshold value is reached. Based on the threshold violations, a list of potential victim workloads is compiled in block B410.

In block B412, a deviation of each victim's response time (or latency) is determined. The deviation maybe determined based on a current value of the latency, a predicted latency value and an upper predicted threshold value for latency. The current value is a measured value and the predicted values are predicted by analyzing historical data as described above.

As an example, the deviation is based on=(Current latency value−forecasted predicted latency value)*100/(forecasted upper bound value-forecasted predicted value)

In block B214, the victims are ranked by the deviation and the process moves to Phase 2. A certain number of victims with the highest deviation are selected for phase 2 analysis. It is noteworthy that although blocks B412/B414 have been described with respect to Phase 1, the blocks may be executed during Phase 2 and other phases described herein. The adaptive aspects described herein are not limited to any particular phase.

Process Flow (Phase 2):

Process 500 begins in block B502 after Phase 1 has identified one or more victim workloads. Process 500 is for analyzing utilization of the various resources that are used by the victim workload. An example of the various resources is provided in FIG. 2E and Table I described above. This allows incident analysis module 227 to identify resource contention between different workloads and then execute Phase 3 for identifying the bully workloads that may be significantly overusing resources.

Process 500 begins in block B502, after at least one victim workload (or storage volume) has been identified. In block B504, incident analysis module 227 retrieves the QOS data associated with the resources used by each victim identified by process 400. The resources may include delay center network 235, N-Module CPU 237, Disk center I/O, D-module CPU 245, Cluster Interconnect Delay Center 247 and any other cluster resource. The various aspects described herein are not limited to any particular resource or any data type associated with any particular resource.

In block B506, the dynamic threshold values (or the expected range) for the QOS data associated with each resource are determined based on collected historical QOS data.

In block B508, incident analysis module 227 computes the deviation of a current response time of each affected resource from the dynamic threshold values. The highest deviation is used to quantify the impact of each resource in block B510. The resources are ranked based on the deviation i.e. the impact of each resource. In block B512, the highest ranking resource is identified as the one having the most impact on the victim workload. The identified resource is considered to be in contention. It is noteworthy that more than one resource may be in contention. After the resource is identified, the process moves to block B514, to Phase 3, when a bully workload is detected.

Table V below shows an example of different calculations that are performed during process 500 (i.e. in blocks B508, B510 and B512) for determining the resources that may be in contention:

TABLE V

| Phase | Name | Description | Calculation |
|---|---|---|---|
| 2 | Normalized workload response time at a resource | As each resource has different usage based on the nature of visits and operation types; the workload response time at a resource is normalized to per operation so that it can be compared with other resources. | $\dfrac{(WT_{WT} + ST_{WT}) * V_{WT}}{OPS_W}$<br><br>WT is the workload wait time at a resource, ST is the workload service time as resource, V is the workload visit rate at the resource, OPS is the workload Operations (OPS) |
| 2 | % response time deviation | This value provides the deviation of a measured response time from an expected response time based on the expected range generated by the performance module 121. | $\dfrac{RT_{measured} - RT_{expected}}{RT_{bound} - RT_{expected}} * 100$<br><br>RT is response time, and RTbound is the upper bound when the measured RT >= expected |
| 2 | Resource impact | This is a combination of deviation and absolute value for the response time to capture the magnitude of deviation such that a resource where a workload that has | % RT deviation * RT where RT is the normalized workload response time at a resource |

TABLE V-continued

| Phase Name | Description | Calculation |
|---|---|---|
| | higher and more abnormal response time is more likely to be the performance bottleneck for a workload. | |

Process Flow (Phase 3):

The process for detecting the bully workload is now described with respect to FIG. 6A. Process 600 is executed to find the workloads (storage volumes) that are causing resource contention. The workloads of all contending resources are examined, and the historical data for workloads are analyzed to determine if the behavior is abnormal. Based on the analysis, workloads are identified as a bully, insignificant or a secondary victim. A bully workload is one that has a high visit rate at the resource and/or a high service time at the resource and/or a higher utilization which is a product of visits per second and the service time per visit. An insignificant workload is one that does not meet a set of pre-defined static threshold values and does not perform a significant amount of work at the resource and hence can be ignored. A secondary victim is a workload that has an abnormally low visit rate and/or a high wait time at the resource. This is different from the Phase 1 victim that detects a workload that suffers from abnormally high overall response time.

Process 600 begins in block B602, when after Phase 2, one or more resources have been identified as being in contention. In block B604, QOS data for each workload associated with the resource in contention is obtained by the incident analysis module 227. The QOS data includes, response time, number of visits by other workloads, service time (when applicable) and wait time. The historical QOS data for the resource is also obtained in block B606. The predictive behavior i.e. the expected range for each workload is generated by the incident analysis module 227 in block B608. As described above, the expected range provides the upper and lower threshold values for each QOS data value for the workload. Each QOS data type value is compared to the dynamic threshold value in block B610.

In block B612, one or more potential bully workload may be identified by the incident analysis module 227. As mentioned above, this determination is made, when a workload has an abnormally high visit rate, high abnormal service time and/or high utilization with respect to an expected range. The secondary victim and insignificant workload may also be identified in block B612.

In another aspect, in block B612, the incident analysis module 227 further determines the deviation of each potential bully. The deviation may be based on the following:

(Current IOPS value-forecasted predicted value)*100/forecasted upper bound value-forecasted predicted value). As described above, the forecast upper bound value and the predicted value are based on historical data that is analyzed by a time series analysis.

In block B613A, each potential bully's impact is analyzed and determined. The impact may be determined based on a product of the current value and the deviation determined above with respect to block B612. Thereafter, in block B613B, the list of potential bullies is filtered based on the impact. As an example, a certain number of bullies (for example, 50) with the highest impact are selected. It is noteworthy that although process blocks B612, B613A and B613B have been described with respect to FIG. 6A, these process blocks may be executed at different phase and durations to keep the list of bullies to a manageable number.

In one aspect, the potential bully workloads are efficiently filtered so that a manageable number of bully storage volumes are processed and handled.

Thereafter, in block B614, the incident analysis module 227 presents a remediation plan to the client. An example of the remediation plan is provided below. Thereafter, the process ends.

In one aspect, an incident may be caused by an external network entity, for example, an authentication server may not be responding in a timely manner to authenticate requests. This delays I/O processing. If an external factor is involved, then the phase 3 analysis described above may be skipped by the performance manager 121.

Remediation Plan:

FIG. 6B shows an example of a remediation plan, according to one aspect. In FIG. 6B, the Delay_Center_network is the service center that may be a resource in contention. The service center is shown in column 616. Column 616 mentions the number of visits for each workload, the service time is shown in Column 620, while the response time is shown in Column 622. The workload analysis is detailed in Column 624. The recommendations for alleviating each situation are described in Column 626 and are self explanatory.

Similar remediation plans are shown in FIGS. 6C-6H. For example, FIG. 6D shows example recommendations involving the CPU-NBlade. FIG. 6E involves the Policy_Group service center, while FIG. 6E shows recommendations for the Cluster_Interconnect. FIG. 6F shows recommendations for the CPU_DBlade, while FIG. 6G shows recommendations for the Aggregate. FIG. 6H shows recommendations for the Disk_HDD. The various service centers in FIG. 6C-6H have been described above.

In one aspect, performance manager 121 provides efficient methods and systems for collecting QOS data, monitoring QOS data, dynamically predicting expected behavior of the QOS (i.e. the expected range) and using the historical data to identify incidents that a client may want to address. The performance 121 also analyzes each incident and provides useful recommendations to clients such that clients can reach their storage related goals and objectives.

Figure 7:
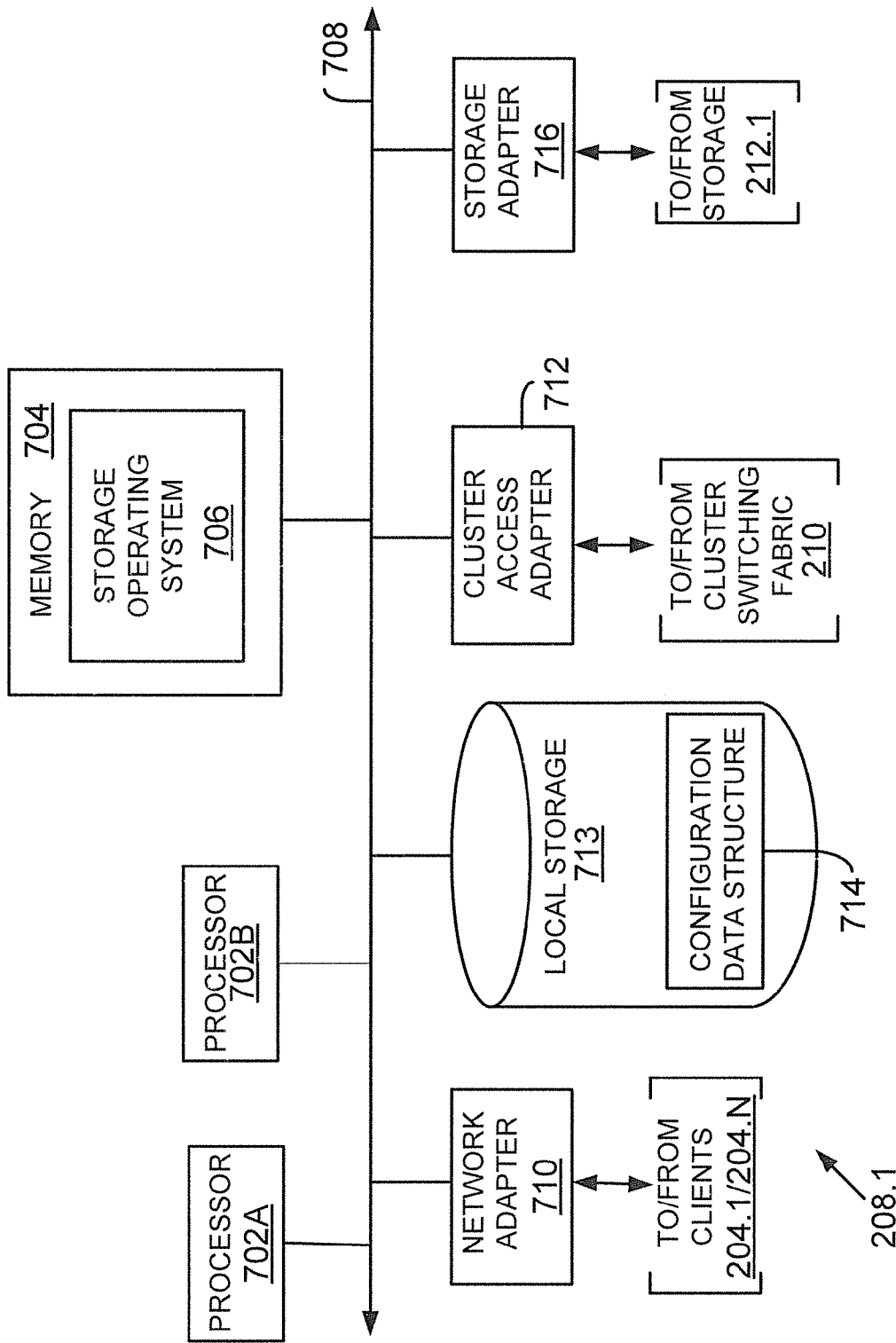
FIG. 7 shows an example of a storage system, used according to one aspect of the present disclosure.

Storage System Node:

FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 717 interconnected by a system bus 708. Node 208.1 may be used to provide QOS information to performance manager 121 described above.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 713 comprises one or more storage devices utilized by the node to locally store configuration information for example, in a configuration data structure 714. The configuration information may include information regarding storage volumes and the QOS associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 712 is utilized by the N/D-module for communicating with other N/D-modules in the cluster 202.

Each node 208.1 is illustratively embodied as a dual processor storage system executing a storage operating system 706 (similar to 107, FIG. 1) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the N-module on the node, while the other processor 702B executes the functions of the D-module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 706 portions of which is typically resident in memory and executed by the processing elements, functionally organizes the node 208.1 by, inter alia, invoking storage operation in support of the storage service implemented by the node.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
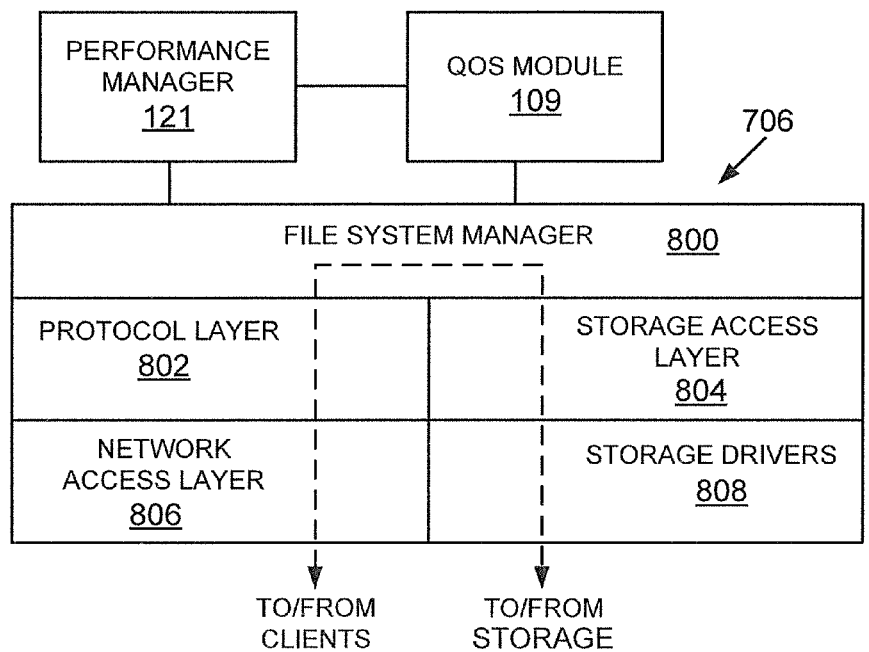
FIG. 8 shows an example of a storage operating system, used according to one aspect of the present disclosure.

Operating System:

FIG. 8 illustrates a generic example of storage operating system 706 (or 107, FIG. 1) executed by node 208.1, according to one aspect of the present disclosure. The storage operating system 706 interfaces with the QOS module 109 and the performance manager 121 such that proper bandwidth and QOS policies are implemented at the storage volume level.

In one example, storage operating system 706 may include several modules, or "layers" executed by one or both of N-Module 214 and D-Module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow D-module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
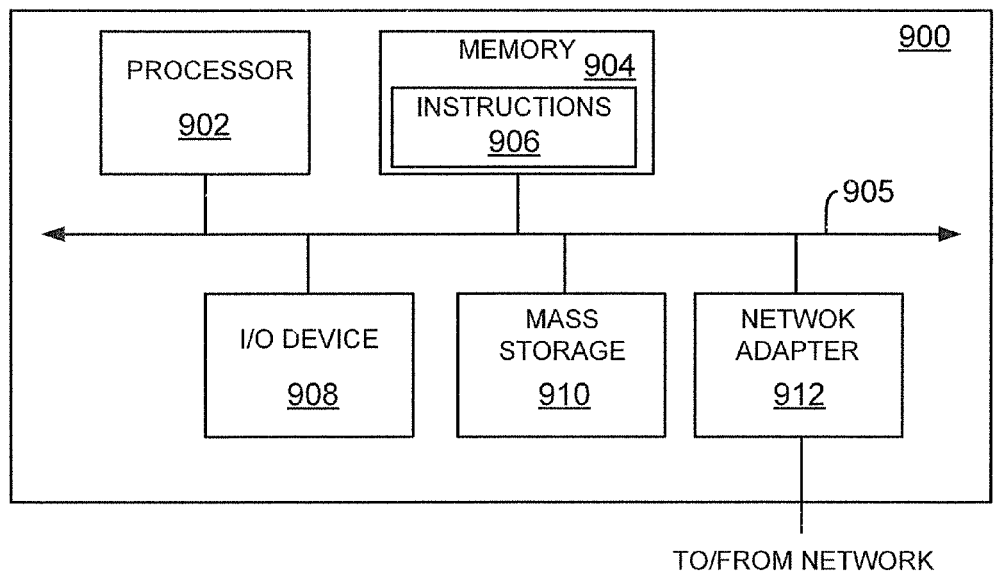
FIG. 9 shows an example of a processing system, used according to one aspect of the present disclosure.

Processing System:

FIG. 9 is a high-level block diagram showing an example of the architecture of a processing system 900 that may be used according to one aspect. The processing system 900 can represent performance manager 121, host system 102, management console 118, clients 116, 204, or storage system 108. Note that certain standard and well-known components which are not germane to the present aspects are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps described above may reside in and executed by processors 902 from memory 904. For example, instructions 906 may be used to implement the forecasting module 223, detection module 225 and incident analysis module 227, according to one aspect.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Thus, a method and apparatus for collecting, monitoring and analyzing QOS data have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
    collecting quality of service (QOS) data for a plurality of storage volumes from a storage operating system of a storage system having a plurality of resources; wherein the QOS data includes a response time in which each of the plurality of storage volumes respond to an input/output (I/O) request; a wait time for each I/O request at each of the resources of the storage system; and a number of visits for each I/O request at each of the resources of the storage system;
    determining an average of N collected QOS data points at any given time;
    iteratively analyzing each QOS data point to detect if a step-up or a step-down function has occurred, where a step-up function represents an unpredictable increase in value of a data point and a step-down function is an unpredictable decrease in value of the data point;
    selecting a subset of the N QOS data points based on when the step-up function or step-down function occurs;
    generating an expected range for future QOS data based on the subset of the N QOS data points, where the expected range is a range of measured performance activity of a workload over a period of time for predicting future QOS data behavior of the storage volumes; and
    monitoring QOS data for each storage volume for determining whether a current QOS data for each storage volume is within the expected range.

2. The method of claim 1, wherein the expected range provides a dynamic threshold value to a processor executable performance manager for predicting an incident associated with any of the plurality of storage volumes.

3. The method of claim 1, wherein the expected range provides a dynamic threshold value to a processor executable performance manager for determining if any of the resource is in contention between any of the plurality of storage volumes resulting in a storage volume becoming a victim due to overuse by a bully storage volume.

4. The method of claim 1, wherein the resources at the storage system are categorized as a service center that services a request and QOS data for the service center includes a number of visits, wait time per visit and service time and a delay center that only moves the request to a next destination whose QOS data includes the number of visits and the wait time per visit.

5. The method of claim 4, wherein the resources include a processor for a network module that interfaces with clients and operates as a service center and a processor for a storage module that operates as a service center and manages storage devices where information is stored.

6. A non-transitory machine readable storage medium having stored thereon instructions for performing a method, comprising machine executable code which when executed by at least one machine, causes the machine to:
collect quality of service (QOS) data for a plurality of storage volumes from a storage operating system of a storage system having a plurality of resources; wherein the QOS data includes a response time in which each of the plurality of storage volumes respond to an input/output (I/O) request; a wait time for each I/O request at each of the resources of the storage system; and a number of visits for each I/O request at each of the resources of the storage system;
determine an average of N collected QOS data points at any given time;
iteratively analyze each QOS data point to detect if a step-up or a step-down function has occurred, where a step-up function represents an unpredictable increase in value of a data point and a step-down function is an unpredictable decrease in value of the data point;
select a subset of the N QOS data points based on when the step-up function or step-down function occurs;
generate an expected range for future QOS data based on the subset of the N QOS data points, where the expected range is a range of measured performance activity of a workload over a period of time for predicting future QOS data behavior of the storage volumes; and
monitor QOS data for each storage volume for determining whether a current QOS data for each storage volume is within the expected range.

7. The storage medium of claim 6, wherein the expected range provides a dynamic threshold value to a processor executable performance manager for predicting an incident associated with any of the plurality of storage volumes.

8. The storage medium of claim 6, wherein the expected range provides a dynamic threshold value to a processor executable performance manager for determining if any of the resource is in contention between any of the plurality of storage volumes resulting in a storage volume becoming a victim due to overuse by a bully storage volume.

9. The storage medium of claim 6, wherein the resources at the storage system are categorized as a service center that services a request and QOS data for the service center includes a number of visits, wait time per visit and service time and a delay center that only moves the request to a next destination whose QOS data includes the number of visits and the wait time per visit.

10. The storage medium of claim 9, wherein the resources include a processor for a network module that interfaces with clients and operates as a service center and a processor for a storage module that operates as a service center and manages storage devices where information is stored.

11. A system, comprising:
a memory containing machine readable medium comprising machine executable code having stored thereon instructions; and a processor module coupled to the memory, the processor module configured to execute the machine executable code to:
collect quality of service (QOS) data for a plurality of storage volumes from a storage operating system of a storage system having a plurality of resources; wherein the QOS data includes a response time in which each of the plurality of storage volumes respond to an input/output (I/O) request; a wait time for each I/O request at each of the resources of the storage system; and a number of visits for each I/O request at each of the resources of the storage system;
determine an average of N collected QOS data points at any given time;
iteratively analyze each QOS data point to detect if a step-up or a step-down function has occurred, where a step-up function represents an unpredictable increase in value of a data point and a step-down function is an unpredictable decrease in value of the data point;
select a subset of the N QOS data points based on when the step-up function or step-down function occurs;
generate an expected range for future QOS data based on the subset of the N QOS data points, where the expected range is a range of measured performance activity of a workload over a period of time for predicting future QOS data behavior of the storage volumes; and
monitor QOS data for each storage volume for determining whether a current QOS data for each storage volume is within the expected range.

12. The system of claim 11, wherein the expected range provides a dynamic threshold value to a processor executable performance manager for predicting an incident associated with any of the plurality of storage volumes.

13. The system of claim 11, wherein the expected range provides a dynamic threshold value to a processor executable performance manager for determining if any of the resource is in contention between any of the plurality of storage volumes resulting in a storage volume becoming a victim due to overuse by a bully storage volume.

14. The system of claim 11, wherein the resources at the storage system are categorized as a service center that services a request and QOS data for the service center includes a number of visits, wait time per visit and service time and a delay center that only moves the request to a next destination whose QOS data includes the number of visits and the wait time per visit.

15. The method of claim 4, wherein a performance manager tracks QOS data for each service center and delay center to predict the expected range.

16. The storage medium of claim 9, wherein a performance manager tracks QOS data for each service center and delay center to predict the expected range.

17. The system of claim 14, wherein a performance manager tracks QOS data for each service center and delay center to predict the expected range.

18. The storage system of claim 14, wherein the resources include a processor for a network module that interfaces with clients and operates as a service center.

19. The system of claim 14, wherein the resources include a processor for a storage module that operates as a service center and manages storage devices where information is stored.

* * * * *